(12) United States Patent
Nagasawa et al.

(10) Patent No.: US 6,683,974 B1
(45) Date of Patent: Jan. 27, 2004

(54) IMAGE DEFECT DETECTION APPARATUS AND IMAGE DEFECT DETECTION METHOD

(75) Inventors: Shunsuke Nagasawa, Kyoto (JP); Hiroyuki Yamagata, Okayama (JP); Yasunori Idehara, Okayama (JP)

(73) Assignees: Sharp Kabushiki Kaisha, Osaka (JP); Sharp Takaya Electronic Industry Co., LTD, Okayama (JP)

( * ) Notice: Subject to any disclaimer, the term of this patent is extended or adjusted under 35 U.S.C. 154(b) by 587 days.

(21) Appl. No.: 09/712,942

(22) Filed: Nov. 16, 2000

(30) Foreign Application Priority Data

Jan. 12, 2000 (JP) .......................... 2000-004092
Apr. 7, 2000 (JP) .......................... 2000-107015

(51) Int. Cl.⁷ ............................................... G06K 9/00
(52) U.S. Cl. ...................................... 382/141; 348/125
(58) Field of Search ........................ 382/141, 145, 382/149, 150; 348/86, 125; 700/95–212; 438/16; 356/426, 429, 237.1

(56) References Cited

U.S. PATENT DOCUMENTS 5,793,221 A * 8/1998 Aoki .......................... 324/765
5,917,957 A * 6/1999 Ichikawa ................... 382/274

FOREIGN PATENT DOCUMENTS

JP        2-234191    *  9/1990
JP        09009303 A     1/1997

* cited by examiner

Primary Examiner—Samir Ahmed
(74) Attorney, Agent, or Firm—Birch, Stewart, Kolasch & Birch, LLP

(57) ABSTRACT

An image defect detection apparatus includes: an image acquisition section for acquiring an image as image data; a check section for checking for the presence or absence of a defect in the image, the defect being of one of a plurality of different types. The check section includes: a matrix setting subsection for setting, within the acquired image, an inspection reference region and an inspection region in accordance with each type of defect; a comparison value extraction subsection for extracting a comparison value based on image data in the inspection reference region and image data in the inspection region as set by the matrix setting subsection; and a comparison subsection for determining the presence or absence of the defect based on a comparison between the comparison value extracted by the comparison value extraction subsection and a predetermined threshold value.

57 Claims, 13 Drawing Sheets

IMAGE DEFECT DETECTION APPARATUS AND IMAGE DEFECT DETECTION METHOD

BACKGROUND OF THE INVENTION

1. Field of the Invention

The present invention relates to an apparatus and method for detecting defects in an image displayed on a display device such as a liquid crystal panel. In particular, the present invention relates to an image defect detection apparatus and an image defect detection method which involves acquiring an image displayed on a display device through imaging techniques, etc., to detect defects in the display device based on the acquired image. The present invention also relates to a storage medium in which a procedure of such an image defect detection is stored.

2. Description of the Related Art

Display screens, e.g., in the form of display panels, are required to provide uniform image quality across the entire screen. In any process for producing display panels, efforts are made to locate defects in display screens by visually inspecting actual images which are displayed on the display screens.

There are various kinds of defects that could occur on display screens, e.g., point defects (i.e., defects occurring in minute regions), stain defects and puddle defects (both of which may occur in sizable areas), and linear defects (which may occur in linear strips). Such a variety of defects are usually detected through visual inspection by a human inspector. However, even if the same inspector checks two display screens which actually provide the same level of image quality, the inspection results may vary depending on the proficiency or the physical condition of the inspector. Thus, inconsistent judgements may result, i.e., products that are considered as satisfactory on one day might be considered as defective on another day. Hence, it is difficult to provide consistent inspection results with a constant accuracy.

Therefore, impartial machine inspection systems are preferred over human visual inspection. However, since there are various types of defects, complete inspection requires a number of check items to be covered.

Japanese Laid-Open Patent Publication No. 9-9303 discloses a structure for inspecting the quality of images presented on a display panel by acquiring an image presented on the display panel and subjecting the image data to various processes corresponding to a number of check items.

However, since the structure disclosed in Japanese Laid-Open Patent Publication No. 9-9303 examines image data on a pixel-by-pixel basis, it only allows for the detection of minute point defects (i.e., defects contained in each pixel) where such point defects produce substantially lower outputs than do their surrounding pixels.

However, a point defect (i.e., a defect contained in a single pixel) often occurs with some degradation due to A/D conversion to which image data is subjected by an A/D converter, a decrease in the voltage level on various wiring, etc., and therefore may also be accompanied by a slight decrease in the outputs of the surrounding (i.e., upper, lower, right, and left) pixels. Therefore, any method that is based on the examination of the image data from only one pixel will have difficulties in locating such point defects.

As for puddle defects and the like, it is often the case that there is only a small decrease in the output from each pixel within the puddle defect area or like defect areas, so that the image data hardly shows any change with respect to each pixel. Therefore, even if such image data are compared against the image data presented by relatively distant pixels, it may still not suffice to accurately detect the puddle defects or the like.

There is also a problem in that, in color displays, a defect may occur as a result of one, or two or more, of the RGB components becoming abnormal, in which case it is difficult or even impossible to know which color component is actually malfunctioning.

Therefore, there is a need for a fast image defect detection apparatus which is capable of comparing a number of pixels at a time and which can realize detection abilities at the level of the human visual inspection.

The aforementioned problems may also arise in situations where there is a need to examine, through imaging of a given surface, whether or not a coating layer on the surface has been uniformly applied.

SUMMARY OF THE INVENTION

According to the present invention, there is provided an image defect detection apparatus including: an image acquisition section for acquiring an image as image data; a check section for checking for the presence or absence of a defect in the image, the defect being of one of a plurality of different types; wherein the check section includes: a matrix setting subsection for setting, within the acquired image, an inspection reference region and an inspection region in accordance with each type of defect; a comparison value extraction subsection for extracting a comparison value based on image data in the inspection reference region and image data in the inspection region as set by the matrix setting subsection; and a comparison subsection for determining the presence or absence of the defect based on a comparison between the comparison value extracted by the comparison value extraction subsection and a predetermined threshold value.

In one embodiment of the invention, the image data acquired by the image acquisition section is image analog data, and the image defect detection apparatus further includes an A/D converter for converting the image analog data into image digital data.

In another embodiment of the invention, the image defect detection apparatus further includes a color separation section for separating the image data into respective color components of a color system.

In still another embodiment of the invention, the image data is image digital data.

In still another embodiment of the invention, the image data is image analog data.

In still another embodiment of the invention, the color separation section performs a check with respect to each separated color component concurrently.

In still another embodiment of the invention, the predetermined threshold value is adjusted according to the respective color components of the color system.

In still another embodiment of the invention, the matrix setting subsection sets a location and a size for each of the inspection reference region and the inspection region, and a distance therebetween.

In still another embodiment of the invention, the matrix setting subsection sets the locations of the inspection reference region and the inspection region so as to adjoin each other in a case where the defect being checked for is a point defect, a stain defect, or a linear defect.

In still another embodiment of the invention, the matrix setting subsection sets the inspection reference region and the inspection region so as to be at a distance from each other in a case where the defect being checked for is a puddle defect, the distance constituting at least one pixel.

In still another embodiment of the invention, the matrix setting subsection sets the size of the inspection reference region and the inspection region at a first value in a case where the defect being checked for is a stain defect, a puddle defect, or a linear defect, and at a second value in a case where the defect being checked for is a point defect, the first value being greater than the second value.

In still another embodiment of the invention, wherein the inspection reference region and the inspection region are each defined as a block consisting of M pixels along a horizontal direction and N pixels along a vertical direction, and wherein M and N are natural numbers such that the relationship M=N=1 does not hold.

In still another embodiment of the invention, the image data acquired by the image acquisition section is image analog data, and the image defect detection apparatus further includes an A/D converter for converting the image analog data into image digital data, and at least one of M and N is set to a value in accordance with output characteristics of the A/D converter.

In still another embodiment of the invention, M=N in a case where the defect being checked for is a point defect.

In still another embodiment of the invention, M<N in a case where the defect being checked for is a linear defect extending along a vertical direction.

In still another embodiment of the invention, M>N in a case where the defect being checked for is a linear defect extending along a horizontal direction.

In still another embodiment of the invention, a comparison position is shifted pixel by pixel within the inspection reference region and the inspection region, the comparison position being sequentially checked for the presence or absence of a defect in the image acquired by the image acquisition section.

Alternatively, according to the present invention, there is provided an image defect detection apparatus including: an image acquisition section for acquiring an image as image data; a plurality of check sections each for checking for the presence or absence of a defect in the image in parallel, the defects being of different types; wherein each check section includes: a matrix setting subsection for setting, within the acquired image, an inspection reference region and an inspection region in accordance with each type of defect; a comparison value extraction subsection for extracting a comparison value based on image data in the inspection reference region and image data in the inspection region as set by the matrix setting subsection; and a comparison subsection for determining the presence or absence of the defect based on a comparison between the comparison value extracted by the comparison value extraction subsection and a predetermined threshold value.

In one embodiment of the invention, the image data acquired by the image acquisition section is image analog data, and the image defect detection apparatus further includes an A/D converter for converting the image analog data into image digital data.

In another embodiment of the invention, the image defect detection apparatus further includes a color separation section for separating the image data into respective color components of a color system.

In still another embodiment of the invention, the image data is image digital data.

In still another embodiment of the invention, the image data is image analog data.

In still another embodiment of the invention, the color separation section performs a check with respect to each separated color component concurrently.

In still another embodiment of the invention, the predetermined threshold value is adjusted according to the respective color components of the color system.

In still another embodiment of the invention, each check section includes at least one processor for performing the checking.

In still another embodiment of the invention, one or more of the plurality of check sections is dedicated to checking for the presence or absence of a stain defect, a puddle defect, or a linear defect, and the one or more check sections each includes at least two processors for performing the checking.

In still another embodiment of the invention, the matrix setting subsection sets a location and a size for each of the inspection reference region and the inspection region, and a distance therebetween.

In still another embodiment of the invention, the matrix setting subsection sets the locations of the inspection reference region and the inspection region so as to adjoin each other in a case where the defect being checked for is a point defect, a stain defect, or a linear defect.

In still another embodiment of the invention, the matrix setting subsection sets the inspection reference region and the inspection region so as to be at a distance from each other in a case where the defect being checked for is a puddle defect, the distance constituting at least one pixel.

In still another embodiment of the invention, the matrix setting subsection sets the size of the inspection reference region and the inspection region at a first value in a case where the defect being checked for is a stain defect, a puddle defect, or a linear defect, and at a second value in a case where the defect being checked for is a point defect, the first value being greater than the second value.

In still another embodiment of the invention, the inspection reference region and the inspection region are each defined as a block consisting of M pixels along a horizontal direction and N pixels along a vertical direction, and wherein M and N are natural numbers such that the relationship M=N=1 does not hold.

In still another embodiment of the invention, the image data acquired by the image acquisition section is image analog data, and the image defect detection apparatus further includes an A/D converter for converting the image analog data into image digital data, and at least one of M and N is set to a value in accordance with output characteristics of the A/D converter.

In still another embodiment of the invention, M=N in a case where the defect being checked for is a point defect.

In still another embodiment of the invention, M<N in a case where the defect being checked for is a linear defect extending along a vertical direction.

In still another embodiment of the invention, M>N in a case where the defect being checked for is a linear defect extending along a horizontal direction.

In still another embodiment of the invention, a comparison position is shifted pixel by pixel within the inspection reference region and the inspection region, the comparison position being sequentially checked for the presence or absence of a defect in the image acquired by the image acquisition section.

In another aspect of the present invention, there is provided an image defect detection method including: an image acquisition step of acquiring an image as image data; a checking step of checking for the presence or absence of a defect in the image, the defect being of one of a plurality of different types; wherein the checking step includes: a matrix setting substep of setting, within the acquired image, an inspection reference region and an inspection region in accordance with each type of defect; a comparison value extraction substep of extracting a comparison value based on image data in the inspection reference region and image data in the inspection region as set by the matrix setting substep; and a comparison substep of determining the presence or absence of the defect based on a comparison between the comparison value extracted by the comparison value extraction substep and a predetermined threshold value.

In still another embodiment of the invention, the image data acquired by the image acquisition step is image analog data, and the image defect detection method further includes an A/D conversion step for converting the image analog data into image digital data.

In still another embodiment of the invention, the image defect detection method further includes a color separation step of separating the image data into respective color components of a color system.

In still another embodiment of the invention, the image data is image digital data.

In still another embodiment of the invention, the image data is image analog data.

In still another embodiment of the invention, the color separation step performs a check with respect to each separated color component concurrently.

In still another embodiment of the invention, the predetermined threshold value is adjusted according to the respective color components of the color system.

In still another embodiment of the invention, the matrix setting substep sets a location and a size for each of the inspection reference region and the inspection region, and a distance therebetween.

In still another embodiment of the invention, a comparison position is shifted pixel by pixel within the inspection reference region and the inspection region, the comparison position being sequentially checked for the presence or absence of a defect in the image acquired by the image acquisition step.

Alternatively, according to the present invention, there is provided an image defect detection method including: an image acquisition step of acquiring an image as image data; a plurality of checking steps of checking for the presence or absence of a defect in the image in parallel, the defects being of different types; wherein each checking step includes: a matrix setting substep of setting, within the acquired image, an inspection reference region and an inspection region in accordance with each type of defect; a comparison value extraction substep of extracting a comparison value based on image data in the inspection reference region and image data in the inspection region as set by the matrix setting substep; and a comparison substep of determining the presence or absence of the defect based on a comparison between the comparison value extracted by the comparison value extraction substep and a predetermined threshold value.

In one embodiment of the invention, the image data acquired by the image acquisition step is image analog data, and the image defect detection method further includes an A/D conversion step for converting the image analog data into image digital data.

In another embodiment of the invention, the method further includes a color separation step of separating the image data into respective color components of a color system.

In still another embodiment of the invention, the image data is image digital data.

In still another embodiment of the invention, the image data is image analog data.

In still another embodiment of the invention, the color separation step performs a check with respect to each separated color component concurrently.

In still another embodiment of the invention, the predetermined threshold value is adjusted according to the respective color components of the color system.

In still another embodiment of the invention, one or more of the plurality of checking steps is dedicated to checking for the presence or absence of a stain defect, a puddle defect, or a linear defect, and the one or more checking steps each includes at least two discrete substeps.

In still another embodiment of the invention, the matrix setting substep sets a location and a size for each of the inspection reference region and the inspection region, and a distance therebetween.

In still another embodiment of the invention, a comparison position is shifted pixel by pixel within the inspection reference region and the inspection region, the comparison position being sequentially checked for the presence or absence of a defect in the image acquired by the image acquisition step.

In yet another aspect of the present invention, there is provided a storage medium in which a procedure of an image defect detection method is stored, the image defect detection method including: an image acquisition step of acquiring an image as image data; a checking step of checking for the presence or absence of a defect in the image, the defect being of one of a plurality of different types; wherein the checking step includes: a matrix setting substep of setting, within the acquired image, an inspection reference region and an inspection region in accordance with each type of defect; a comparison value extraction substep of extracting a comparison value based on image data in the inspection reference region and image data in the inspection region as set by the matrix setting substep; and a comparison substep of determining the presence or absence of the defect based on a comparison between the comparison value extracted by the comparison value extraction substep and a predetermined threshold value.

Alternatively, according to the present invention, there is provided a storage medium in which a procedure of an image defect detection method is stored, the image defect detection method including: an image acquisition step of acquiring an image as image data; a plurality of checking steps of checking for the presence or absence of a defect in the image in parallel, the defects being of different types; wherein each checking step includes: a matrix setting substep of setting, within the acquired image, an inspection reference region and an inspection region in accordance with each type of defect; a comparison value extraction substep of extracting a comparison value based on image data in the inspection reference region and image data in the inspection region as set by the matrix setting substep; and a comparison substep of determining the presence or absence of the defect based on a comparison between the comparison value extracted by the comparison value extraction substep and a predetermined threshold value.

Thus, according to the present invention, it is possible to provide detection abilities which cover various check items, e.g., point defects, stain defects, puddle defects, and linear defects, that are accomplished conventionally by human inspectors. It is also possible to break down an acquired image into color components (e.g., RGB) to detect which specific color component has become abnormal. It is also possible to provide an evaluation for each entire display screen based on the size and/or shape of the inspection region versus an inspection reference region, according to the needs of the various defect checks. It is also possible to perform a quick inspection process that covers a number of check items for each color component simultaneously. Thus, it is possible to provide fast and accurate defect detection without imposing any requirements on the proficiency or physical condition of a human inspector, thereby contributing to improvement in production yield and product quality of display apparatuses.

Thus, the invention described herein makes possible the advantages of (1) providing a fast and accurate method and apparatus for image defect detection which is capable of detecting various defects without imposing any requirements on the proficiency or physical condition of a human inspector: and (2) providing a storage medium in which a procedure of such an image defect detection is stored.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described in detail by way of illustrative examples and with reference to the accompanying figures.

EXAMPLE 1

Figure 1:
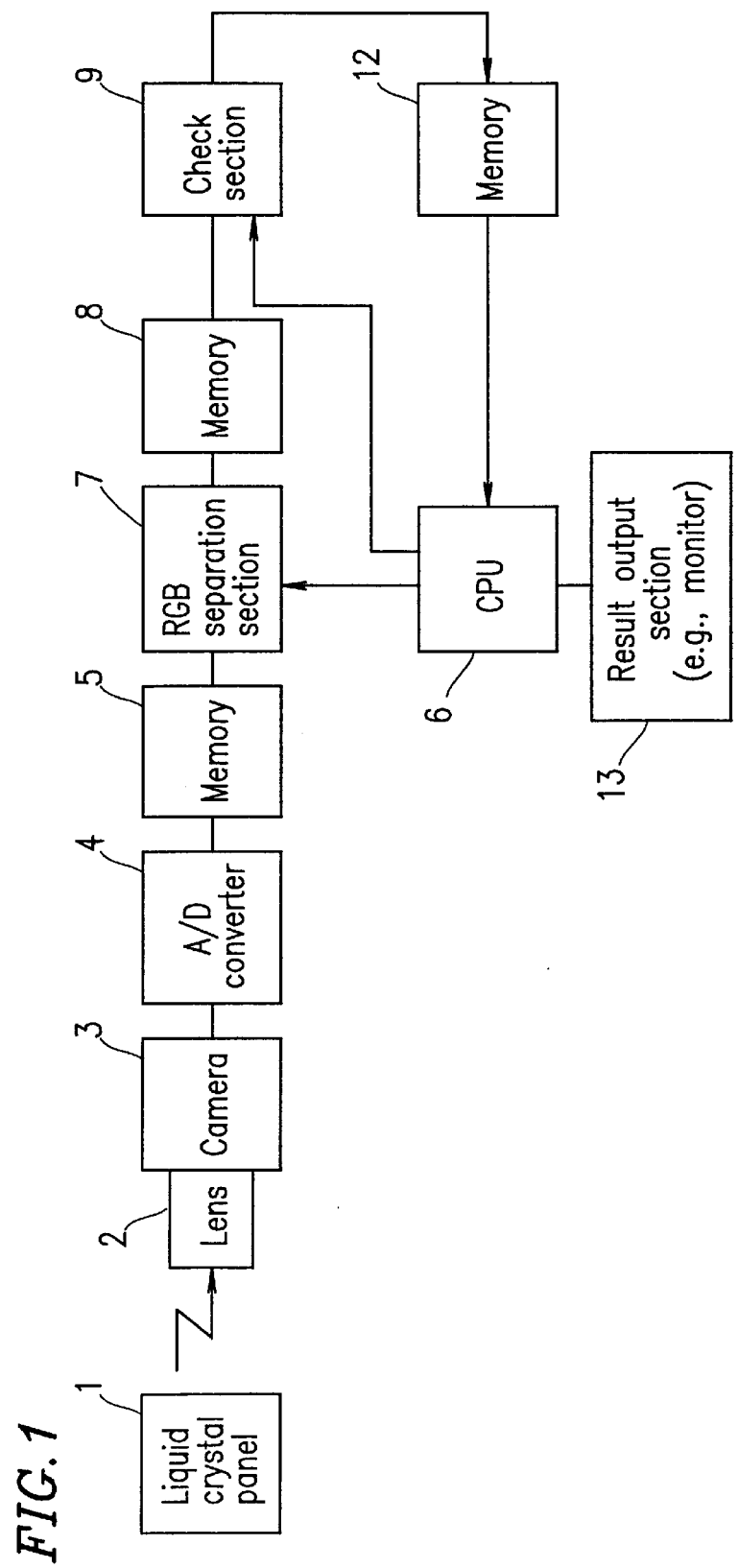
FIG. 1 is a block diagram illustrating an image defect detection apparatus according to Example 1 of the present invention.

FIG. 1 is a block diagram illustrating an image defect detection apparatus according to Example 1 of the present invention. The image defect detection apparatus includes a camera 3 which is used for imaging defects in an image presented on a display device, which may be a liquid crystal panel 1, for example. The camera 3 images the liquid crystal panel 1 through a lens 2. The image taken by the camera 3 is output according to the NTSC method, which in itself is known in the art.

The output from the camera 3 is converted into a digital signal by an A/D converter 4, and the digital signal is stored in a memory 5. Alternatively, the A/D converter 4 may be internally provided within the camera 3, rather than being a separately component element which succeeds and receives the output from the camera 3.

The digital signal representing an image, stored in the memory 5, is decomposed into color components of R (red), G (green), and B (blue) by a RGB separation section 7, which is controlled by a CPU 6. The RGB components are separately stored in the memory 8. The RGB separation section 7 may be constructed from a commonly used composite material or the like. Instead of obtaining a digital signal through an analog to digital conversion by the A/D converter 4 and then separating the digital signal into RGB components, an analog signal which is output from the camera 3 may be separated into RGB components and thereafter subjected to A/D conversion.

The respective color components separately stored in the memory 8 are checked by a check section 9 for performing a check with respect to each color component, which is controlled by the CPU 6, according to a check method of the present invention (described later) and the check results are stored in a memory 12. Based on the contents stored in the memory 12, the CPU 6 outputs check results to a result output section 13. The result output section 13 may be implemented as a display device (e.g., a monitor), an alarm device (e.g., a buzzer) for generating an alarm sound, or a communication device, which provides information on the check results to any subsequent apparatus for performing post-check processes. The CPU 6 may select, as appropriate, whether to make the determination of check results after executing each check item or after completing all of the check items.

Figure 2:
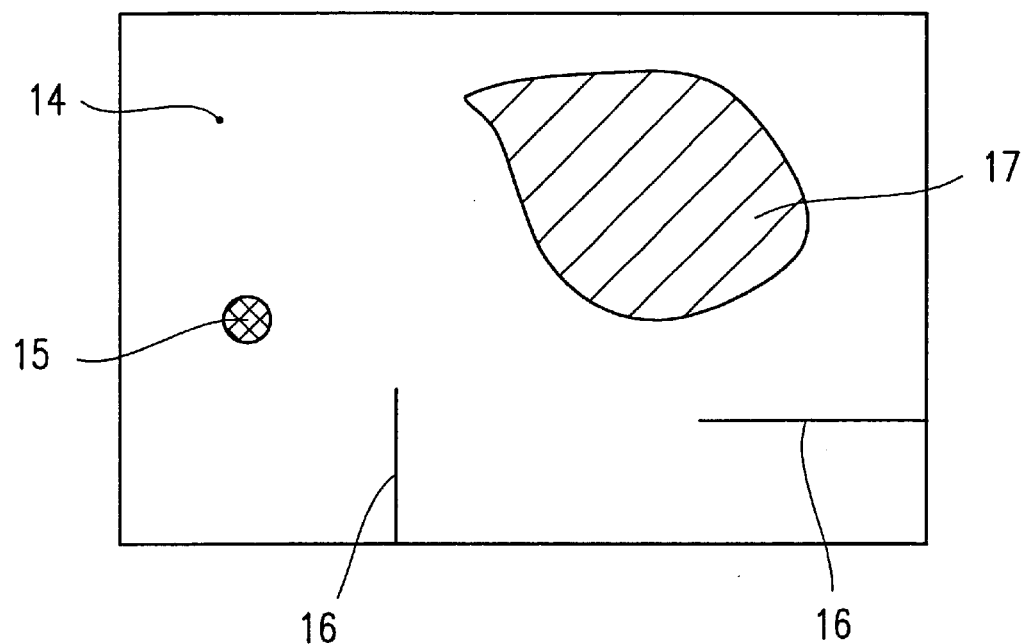
FIG. 2 is a schematic representation of typical defects which can be detected by the image defect detection apparatus according to the present invention.

FIG. 2 is a schematic representation of typical image defects, including a point defect 14, a stain defect 15, linear defects 16, and puddle defects 17. The point defect 14 represents a single pixel of the liquid crystal panel 1 containing digital data which is significantly higher or lower than the level of the digital data in the surrounding pixels. The stain defect 15 represents an area including a number of pixels containing digital data each of which is higher or lower than the level of the digital data in the surrounding pixels, the differences typically being smaller than those between the point defect 14 and its surrounding pixels.

Each line defect 16 represents a linear (vertical or horizontal) aggregation of pixels containing digital data each of which is higher or lower than the level of the digital data in the surrounding pixels, the differences typically being smaller than those between the point defect 14 and its surrounding pixels (as in the case of the stain defect 15). The puddle defect 17 represents an area larger than the stain defect 15 including a number of pixels containing digital data each of which is higher or lower than the level of the digital data in the surrounding pixels, the differences being even smaller than those between the stain defect 15 and its surrounding pixels.

Figure 3:
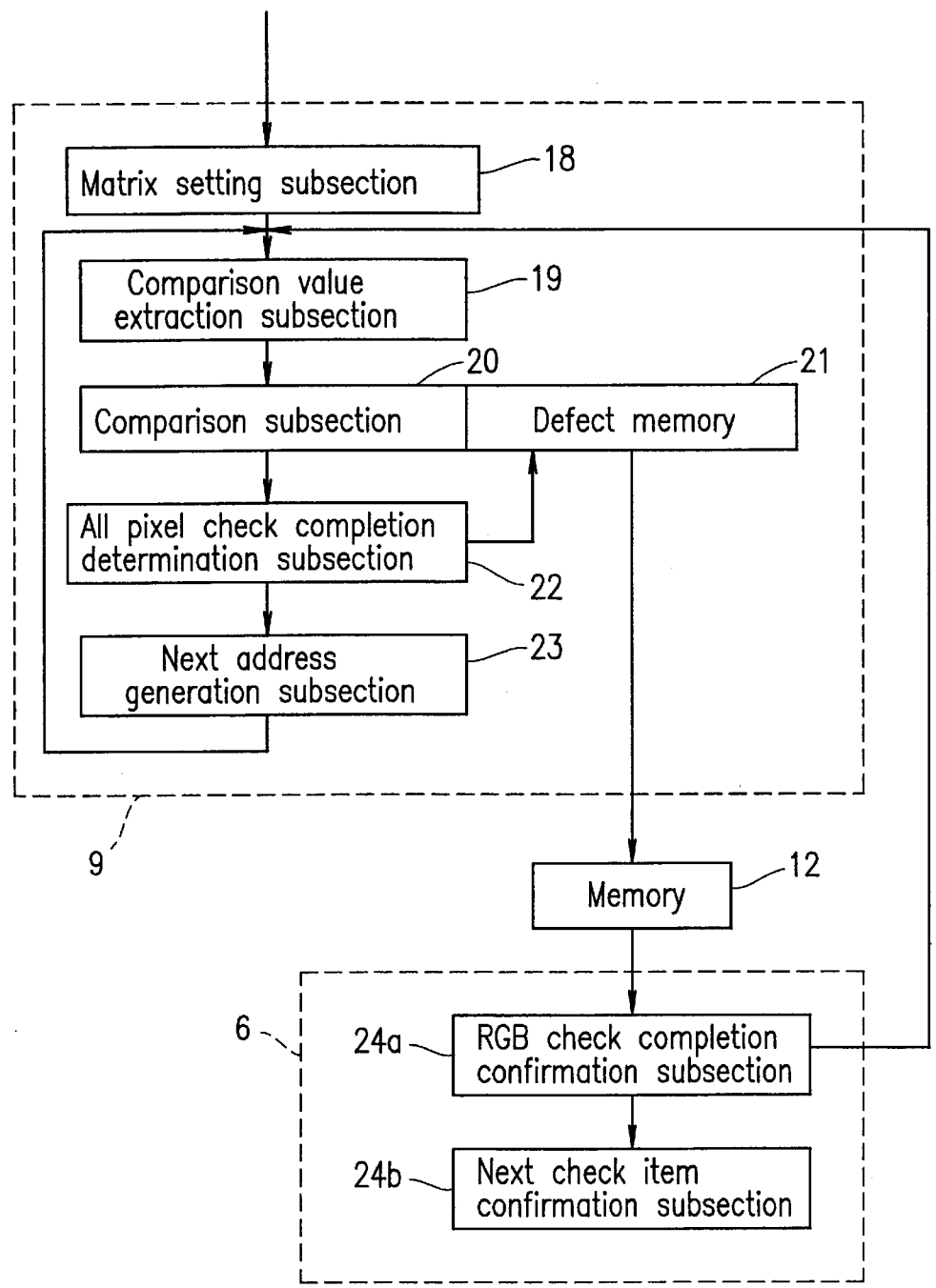
FIG. 3 is a block diagram illustrating a portion of the image defect detection apparatus according to Example 1 of the present invention.

FIG. 3 is a block diagram illustrating the operation of the check section 9. The check section 9 includes a matrix setting subsection 18 for setting an inspection reference region and an inspection region, as well as specific comparison positions therein. Specifically, the matrix setting subsection 18 sets the locations, size, and distance between respective matrices or the inspection reference region and the inspection region.

A comparison value extraction subsection 19 extracts a comparison value representing a difference, ratio, etc. between the digital data of a pixel(s) within the inspection reference region (having a matrix size as set by the matrix setting subsection 18) and the digital data of a pixel(s) within the inspection region (having the same matrix size as the inspection reference region as set by the matrix setting subsection 18).

A comparison subsection 20 compares the comparison value which has been extracted by the comparison value extraction subsection 19 against a prescribed threshold value. If any defects are detected based on the comparison performed by the comparison subsection 20, various data concerning the detected defects is stored in a defect memory 21.

The check section 9 further includes an all pixel check completion determination subsection 22 and a next address generation subsection 23. The all pixel check completion determination subsection 22 determines whether or not all of the pixels in the liquid crystal panel 1 have been checked. If the all pixel check completion subsection 22 determines that not all of the pixels in the liquid crystal panel 1 have been checked, the next address generation subsection 23 sets a next address for checking, and the comparison value extraction subsection 19 and the subsequent subsections execute each check item at a new check position as indicated by the next address.

If the all pixel check completion subsection 22 determines that all of the pixels in the liquid crystal panel 1 have been checked, the data stored in the defect memory 21 is output to the memory 12, also shown in FIG. 1. Then, an RGB check completion confirmation subsection 24a which is implemented within the CPU 6 confirms whether or not a check has been completed for all (RGB) color components. If the check has not been completed for all (RGB) color components, then the comparison value extraction subsection 19 performs a check for any color components (R, G, and/or B) that have not yet been checked.

If the check has been completed for all (RGB) color components, then a next check item confirmation subsection 24b which is implemented within the CPU 6 determines whether or not a next check item to be performed exists. Possible check items include checks for point defects 14, stain defects 15, linear defects 16 (which may be vertical and/or horizontal), puddle defects 17, etc. If a check item(s) is left to be executed, the control returns to the matrix setting subsection 18 to execute that check item.

Figure 4:
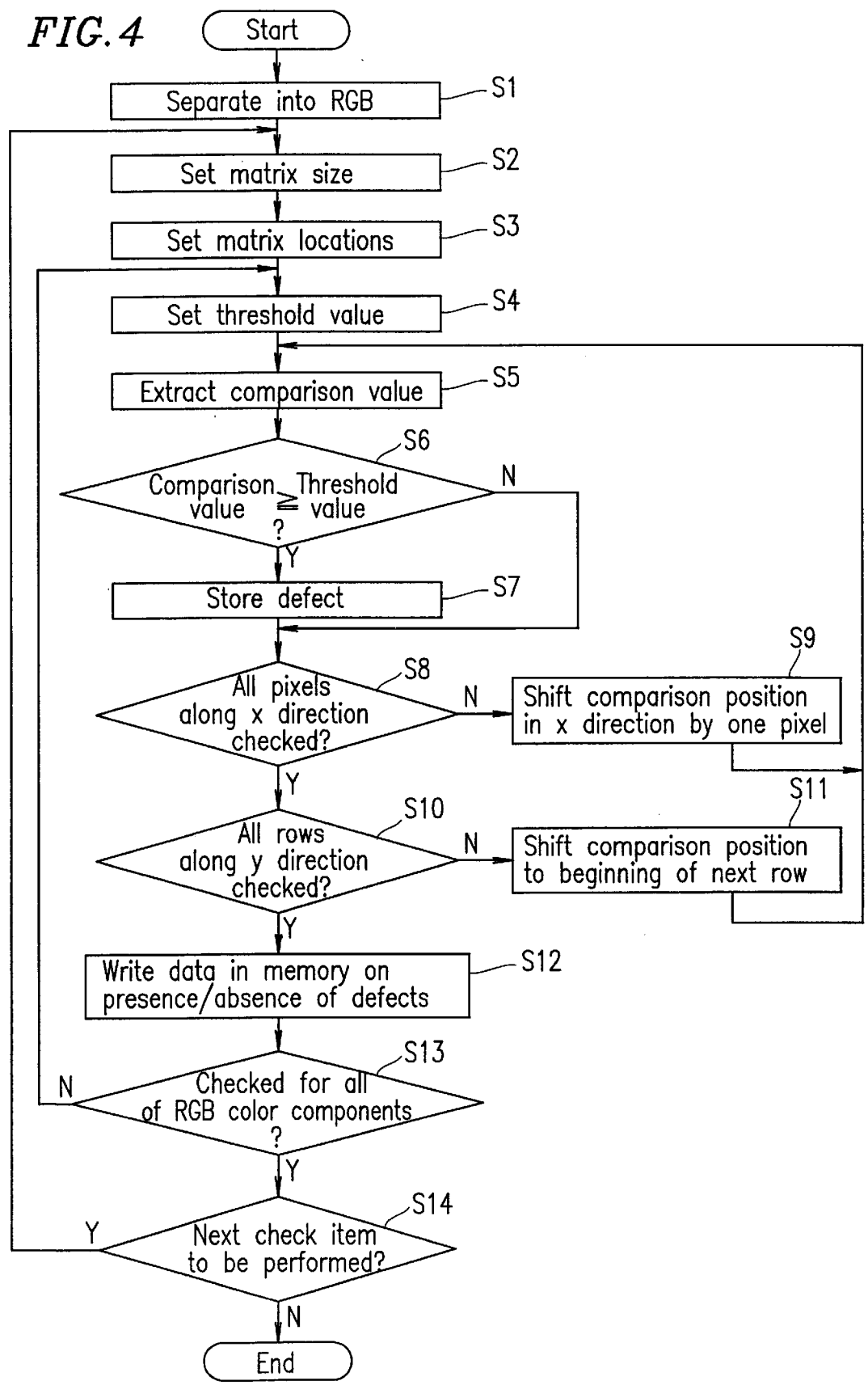
FIG. 4 is a flow chart illustrating the operation of the image defect detection apparatus according to Example 1 of the present invention.

FIG. 4 is a flow chart illustrating a defect detection method which is implemented by the image defect detection apparatus according to the present example of the present invention. First, an image which is taken by the camera 3 and displayed on the display panel 1 is separated by the RGB separation section 7 into the respective color components of RGB (Step S1 in FIG. 4). Next, in order to detect defects occurring in minute regions (e.g., point defects 14), for example, the matrix setting subsection 18 sets an inspection reference region 38 and an inspection region 39 at a relatively small matrix size, e.g., 3 pixels×3 pixels as shown in FIG. 5 (Step S2 in FIG. 4).

Figure 15:
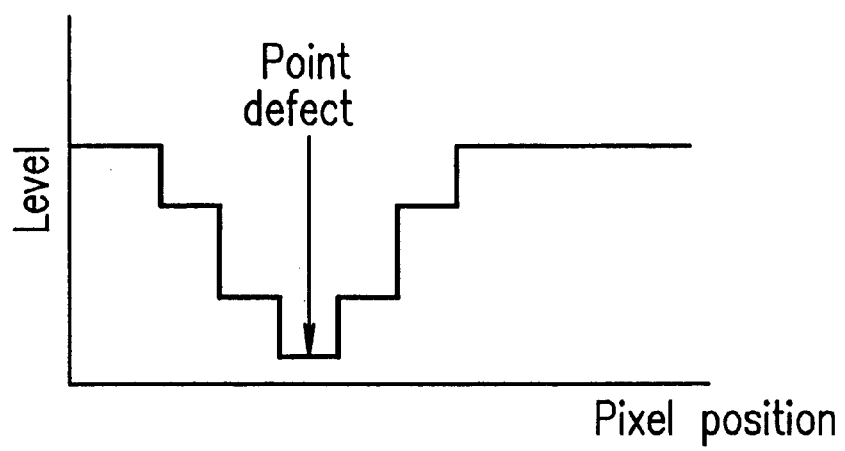
FIG. 15 is a schematic representation of an exemplary pixel defect.

It will be appreciated that the matrix size/shape of the inspection reference region 38 and the inspection region 39 are not limited to a 3 pixel×3 pixel rectangular region, but may also be a circular or elliptical region. Although a point defect 14 usually appears as a single pixel defect, it may occasionally also affect a number of surrounding pixels, as shown in FIG. 15, due to signal deterioration caused by the A/D conversion or by the passage of signals through wiring. Therefore, in order to detect point defects 14, it is useful to set the inspection reference region 38 and the inspection region 39 at a matrix size which accounts for the effects of such signal deterioration.

Figure 5:
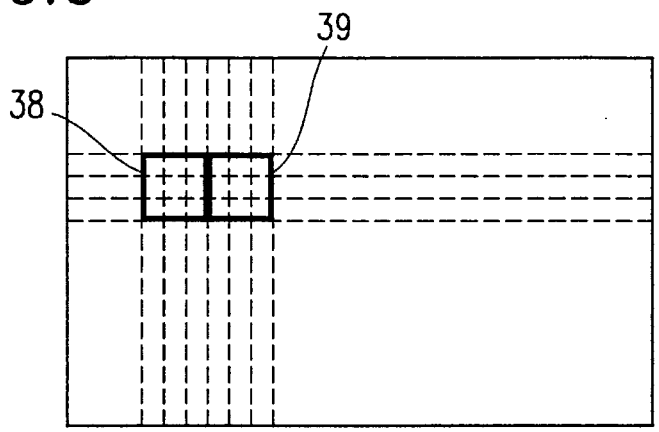
FIG. 5 is a schematic diagram illustrating how an inspection region and an inspection reference region may be set in the case of detecting point defects by using the image defect detection apparatus according to the present invention.

Next, as shown in FIG. 5, the inspection region 39 is set on the immediate right-hand side of the inspection reference region 38 (Step S3 in FIG. 4). Usually, in order to detect defects such as point defects 14, it is preferable to set the inspection region 39 and the inspection reference region 38 so as to adjoin each other, in an upper-lower or right-left relationship, so as to minimize the influence of any variation in the digital data of the pixels over the entire display screen. However, the inspection region 39 may be set a few pixels apart from the immediate right-hand side of the inspection reference region 38 in order to take into account the effects of the aforementioned signal deterioration.

Once the locations of the inspection region 39 and the inspection reference region 38 are set, threshold values for determining the presence or absence of defects are set in the comparison subsection 20 (Step S4). A threshold value is set for each of the RGB color components, in accordance with the actual RGB color components of the image presented on the liquid crystal panel 1.

Once the threshold values are set, the comparison value extraction subsection 19 extracts a comparison value (Step 5S), which is a difference between a sum of the digital data in all of the pixels within a 3 pixel×3 pixel matrix defining the inspection reference region 38 as set in Steps S2 and S3 and a sum of the digital data in all of the pixels within a 3 pixel×3 pixel matrix defining the inspection region 39 as set in Steps S2 and S3.

The comparison value which has thus been extracted is compared against the threshold value which has been set in Step S4 (Step S6), whereby the presence or absence of defects in the displayed image on the liquid crystal panel 1 is determined. Usually, a point defect 14 is determined if the comparison value is equal to or greater than the predetermined threshold value.

For example, assume that the digital data of one pixel consists of 8 bits from 0 to 255, and that an ideal digital data value in any image taken by the camera 3 is supposed to be 128. If the sum of the digital data in all of the pixels in the inspection reference region 38 of the matrix size shown in FIG. 5 is 1100 and the sum of the digital data in all of the pixels in the inspection region 39 is 1150, then the comparison value is calculated to be 50 (=1150−1100) through the comparison extraction in Step S5 (FIG. 4). Assuming that a threshold value of 40 has been set in Step S4, the comparison in Step S6 indicates that 50 (comparison value) ≧40 (threshold value). Therefore, it is determined that a defect is present at this particular comparison position. Conversely, with a threshold value of 60, for example, no defect would be determined at this particular comparison position.

Although the above-illustrated digital data comparison is based on a comparison between a threshold value and a comparison value which is a difference between the sums of the digital data in all of the pixels within the inspection region 39 and the inspection reference region 38, the comparison value may alternatively be a difference between mean values or change ratios of the digital data in all of the pixels within the inspection region 39 and the inspection reference region 38.

Although the inspection region 39 and the inspection reference region 38 are illustrated as being of the same size, they may be of different sizes in the case where a comparison is made on the basis of mean values. It would be more effective to perform a comparison based on the data in a number of pixels, rather than based on a single pixel, because a point defect, although being a defect contained in a single pixel by definition, is often accompanied by some degradation associated with the A/D conversion performed by an A/D converter, signal deterioration on various wiring, etc., and may hence result in defects of a number of pixels clustered around one particular pixel, as shown in FIG. 15.

Although the comparison is made along the horizontal or x direction in the above example, the detection accuracy may be further increased by also performing a comparison along the vertical or y direction.

If a defect is determined, the information concerning the location and the like of the defect is stored in the defect memory 21 (Step S7 in FIG. 4).

When the check for a predetermined comparison position is completed, it is determined whether or not all of the pixels in a given row (extending along the x direction) have been checked (Step S8). If it is determined that not all of the pixels in that row have been checked, the comparison position is shifted by one pixel along the x direction (Step S9) and a similar check is performed for the new comparison position. If it is determined that all of the pixels in the row have been checked, then it is determined whether or not all of the rows along the y direction within the inspection region 39 and the inspection reference region 38 have been checked (Step S10). If it is determined that not all of the rows along the y direction within the inspection region 39 and the inspection reference region 38 have been checked, then the comparison position is shifted to the beginning of a next row, and a similar check is performed for the new comparison position (Step S11).

In the above-illustrated example, where the inspection region 39 is designated on the right side of the inspection reference region 38 along the x direction as a result of the location setting in Step S3, the comparison position is shifted by every one pixel toward the right along the x direction, and after the checks for all of the pixels in a given row have been completed, the checks are continued at the beginning of a subsequent row (i.e., one row down along the y direction). Alternatively, in embodiments of the present invention where the inspection region 39 is designated on the left side of the inspection reference region 38, the comparison position will be shifted by every one pixel toward the left along the x direction. Alternatively, in embodiments where the inspection region 39 is designated below the inspection reference region 38, the comparison position will be shifted down by every one pixel along the y direction.

Thus, the entire image is checked for point defects 14 with respect to each of the RGB color components (Step S13). Once the entire image has been checked for point defects 14 with respect to all of RGB color components, it is determined whether or not a next check item to be performed exists. (Step S14). If, for example, stain defects 15 remain to be checked for, then the entire image will be checked for stain defects 15 in a similar manner. Typically, as described above, check items include point defects 14, stain defects 15, linear defects 16 (which may be vertical and/or horizontal), and puddle defects 17, etc. The entire image defect detection process will end upon completion of all of the check items.

In order to detect stain defects 15, the matrix size of the inspection reference region 38 and the inspection region 39 is set to a size which is larger than that employed for detecting point defects 14, and a stain defect 15 is determined if the comparison value is equal to or greater than the predetermined threshold value. Otherwise, the detection of stain defects 15 is performed in the same manner as in the detection of point defects 14.

Figure 6:
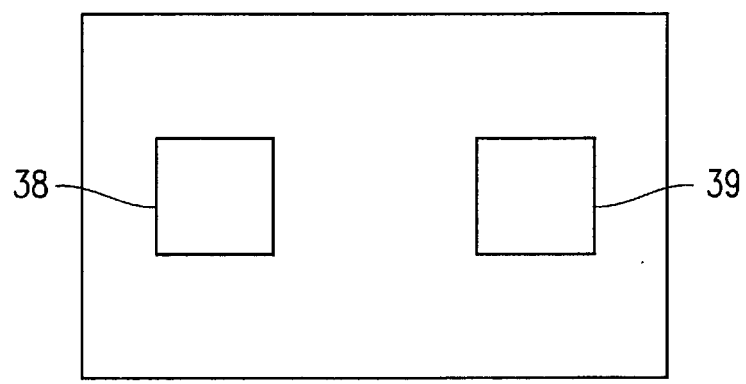
FIG. 6 is a schematic diagram illustrating how an inspection region and an inspection reference region may be set in the case of detecting puddle defects by using the image defect detection apparatus according to the present invention.

In order to detect puddle defects 17, the matrix size of the inspection reference region 38 and the inspection region 39 is set to a relatively large size (e.g., 30 pixels×30 pixels) which is larger than that employed for detecting point defects 14, as shown in FIG. 6. Since a puddle defect 17 contains digital data which gradually varies over a number of pixels therein, the inspection region 39 is preferably set to an appropriate distance from the inspection reference region 38 as shown in FIG. 6.

In an image which is taken by the camera 3, the digital data output from pixels present in the central portion of the display is likely to be boosted by the lens 2. Therefore, in the case where the inspection reference region 38 and the inspection region 39 are set side by side along the x direction (horizontal direction), it would be effective to ensure that the inspection reference region 38 and the inspection region 39 are set apart by about half of the horizontal dimension of the displayed image.

The difference between the digital data in the pixels within the inspection region 39 and the digital data in the pixels within the inspection reference region 38 is used as a comparison value, based on which puddle defects 17 can be detected. A relatively small comparison value qualifies for determining puddle defects 17.

Figure 7:
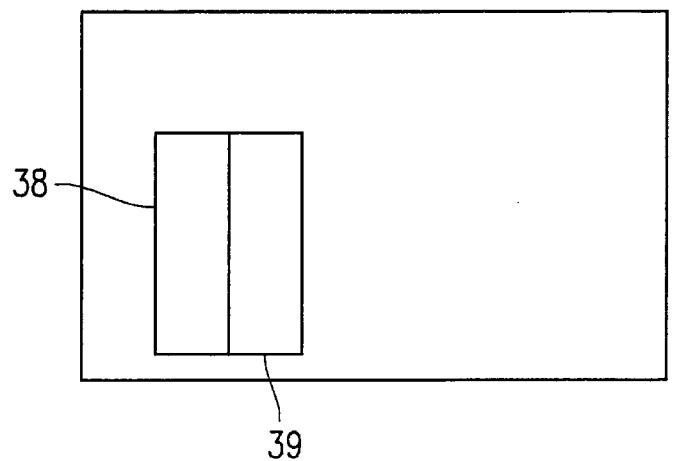
FIG. 7 is a schematic diagram illustrating how an inspection region and an inspection reference region may be set in the case of detecting vertical linear defects by using the image defect detection apparatus according to the present invention.

In order to detect line defects 16 which extend along the vertical direction (y direction), the inspection reference region 38 and the inspection region 39 are prescribed with an elongated matrix size along the y direction (e.g., 2 pixels (x direction)×50 pixels (y direction)) which is larger than that employed for detecting point defects 14, as shown in FIG. 7. It is preferable to set the inspection region 39 and the inspection reference region 38 so as to adjoin each other in order to minimize the influence of any variation in the digital data of the pixels over the entire display screen. Line defects 16 extending along the vertical direction (y direction) may be sufficiently detected by simply comparing the digital data in each pixel in the horizontally adjoined inspection region 39 and inspection reference region 38.

In order to detect line defects 16 which extend along the horizontal direction (x direction), the inspection reference region 38 and the inspection region 39 are prescribed with an elongated matrix size along the x direction (e.g., 50 pixels (x direction)×2 pixels (y direction)) which is larger than that employed for detecting point defects 14. Line defects 16 extending along the horizontal direction (x direction) may be sufficiently detected by setting the inspection region 39 and inspection reference region 38 so as to vertically adjoin each other, and simply comparing the digital data in each pixel therein.

Thus, by changing the matrix size and relative locations of the inspection region 39 and the inspection reference region 38 and employing different threshold values for detecting each different type of defect, it is possible to detect various types of defects with a high accuracy. Thus, the quality of satisfactory final products can be further improved.

Usually, the preferable threshold value per pixel (threshold value/matrix) is largest for the detection of point defects 14, followed by stain defects 15 and line defects 16, and smallest for the detection of puddle defects 17. Similarly, the preferable matrix size of the inspection region 39 and the inspection reference region 38 is smallest for the detection of point defects 14, followed by stain defects 15 and line defects 16, and largest for the detection of puddle defects 17.

Although the above example illustrates a case where one threshold value is employed for distinguishing satisfactory products from defective products, it is applicable to employ two or more threshold values for classifying inspected products into a number of quality ranks.

Although various types of defects are consecutively checked for with respect to each color component according to Example 1, it is also possible to perform the respective check processes in parallel, as described in Example 2.

EXAMPLE 2

Figure 8:
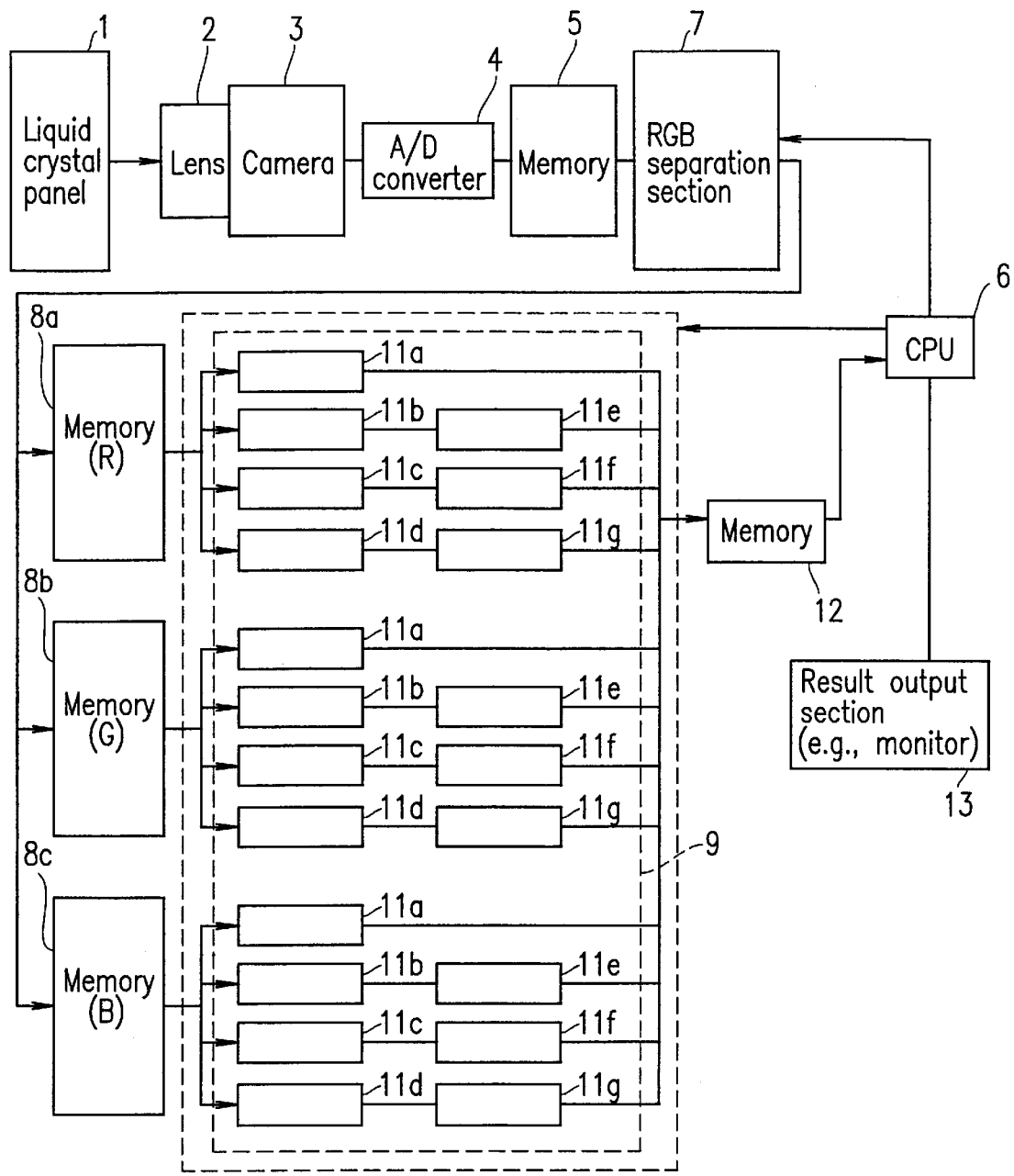
FIG. 8 is a block diagram illustrating an image defect detection apparatus according to Example 2 of the present invention.

FIG. 8 is a block diagram illustrating an image defect detection apparatus according to Example 2 of the present invention. Component elements which also appear in FIG. 1 (Example 1) are denoted with the same reference numerals as used therein. As in Example 1, the image defect detection apparatus includes a camera 3 which is used for imaging defects in an image presented on a display device, which may be a liquid crystal panel 1, for example. The camera 3 images the liquid crystal panel 1 through a lens 2. The image taken by the camera 3 is output according to the NTSC method.

The output from the camera 3 is converted into a digital signal by an A/D converter 4, and the digital signal is stored in a memory 5. Alternatively, the A/D converter 4 may be internally provided within the camera 3, rather than being a separate component element which succeeds and receives the output from the camera 3.

The digital signal representing an image, stored in the memory 5, is decomposed into color components of R (red), G (green), and B (blue) by the RGB separation section 7, which is controlled by a CPU 6. The RGB components are separately stored in memories 8a (R), 8b (G), and 8c (B), for example. As in Example 1, the RGB separation section 7 may be constructed from a commonly used composite material or the like. Instead of obtaining a digital signal through an analog to digital conversion by the A/D converter 4 and then separating the digital signal into RGB components, an analog signal which is output from the camera 3 may be separated into RGB components and thereafter subjected to A/D conversion.

The respective color components separately stored in the memories 8a to 8c are checked by a check section 9 for performing a check with respect to each color component, which is controlled by the CPU 6, according to a check method of the present invention (described later). For each of the memories 8a (R), 8b (G), and 8c (B), the check section 9 includes a point defect detection section 11a which checks for point defects 14 (see FIG. 2), stain defect detection sections 11b and 11e which check for stain defects 15 (see FIG. 2), puddle defect detection sections 11c and 11f which check for puddle defects 17 (see FIG. 2), and linear defect detection sections 11d and 11g which check for linear defects 16 (see FIG. 2). The check results are stored in a memory 12. Based on the contents stored in the memory 12, the CPU 6 outputs check results to a result output section 13. As in Example 1, the result output section 13 may be implemented as a display device (e.g., a monitor), an alarm device (e.g., a buzzer) for generating an alarm sound, or a communication device, which provides information on the check results to any subsequent apparatus for performing post-check processes. The CPU 6 may select, as appropriate, whether to make the determination of check results after executing each check item or after completing all of the check items.

Figure 9:
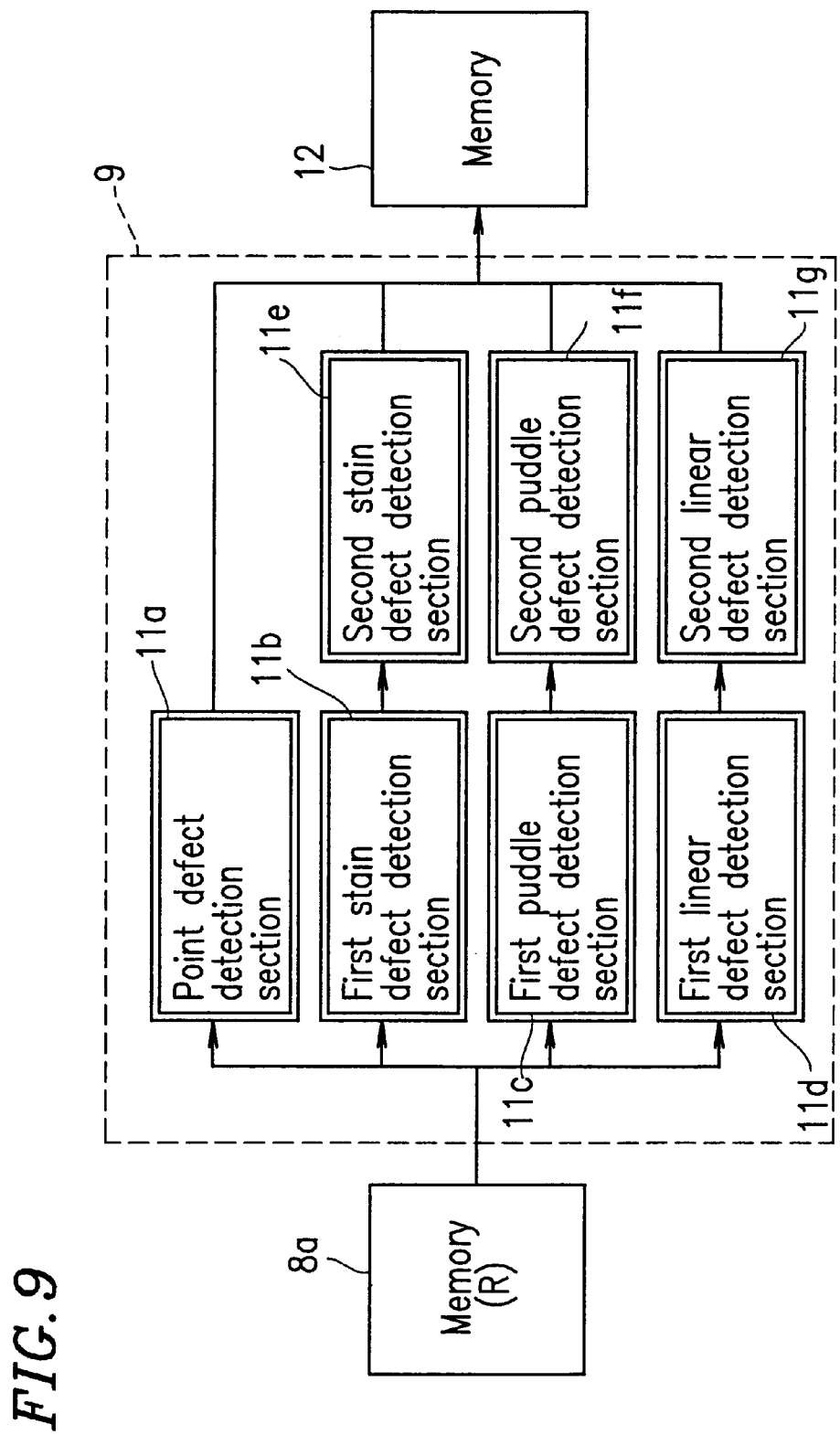
FIG. 9 is a block diagram illustrating a portion of the image defect detection apparatus according to Example 2 of the present invention.

FIG. 9 is a block diagram illustrating the structure of the check section 9 in more detail. Now, an example will be described where four defect detection processes, i.e., for point defects, stain defects, linear defects, and puddle defects, are performed in parallel with respect to the R component.

The point defect detection section 11a is a processor which checks for point defects. The first and second stain defect detection sections 11b and 11e are processors which check for stain defects. The first and second puddle defect detection sections 11c and 11f are processors which check for puddle defects 17. The first and second linear defect detection sections 11d and 11g are processors which check for linear defects 16. The defect detection sections 11a to 11d perform their respective processes for the data associated with the R component alone, which has been separated through the RGB separation process (described with reference to FIG. 8) and stored in the R component memory 8a. By thus performing the four types of defect checks in parallel with respect to each color component, it is possible to quickly perform all of the defect checks. It is contemplated that even a larger number of check items may be executed in parallel. Since these defect checks with respect to the R, G, and B color components can also be performed in parallel, the overall process speed is further increased.

The amounts of processing that need to be performed by the respective processors vary depending on the check item because the size of the matrix to be processed varies depending on the type of defect as described later. Therefore, the defect detection processes for check items that require large amounts of processing and therefore longer processing time may be split among and performed by a number of processors, whereby the overall process speed can be further increased.

For example, consider a puddle defect check (described later) for a matrix size of 30×30 pixels. First, a difference between an inspection region 39 and an inspection reference region 38 with respect to each row of 1×30 pixels (corresponding to one row in the inspection region 39 or the inspection reference region 38) may be calculated by the first puddle defect detection section 11c, and the calculated data values may be passed to the second puddle defect detection section 11f, which totals the data values from 30 rows along the vertical direction. Thus, a difference value for the 30×30 matrix can be obtained.

Although two processors are employed to execute stain defect checks, puddle defect checks and linear defect checks, any number of processors may be used. However, the burden for each processor should be evened out so that they process similar amounts of data with similar processing times. Although the above example illustrates a case where the processes are split with respect to different check items, other division methods may be used in applications where any particular defect check takes an extremely long time. For example, the processes may be split with respect to the upper portion, central portion, and the lower portion, etc., of the acquired image.

The aforementioned processors 11a to 11g may be Neumann type processors or non-Neumann type processors. The use of non-Neumann type processors enables faster processing because they permit pipeline processing.

Figure 10:
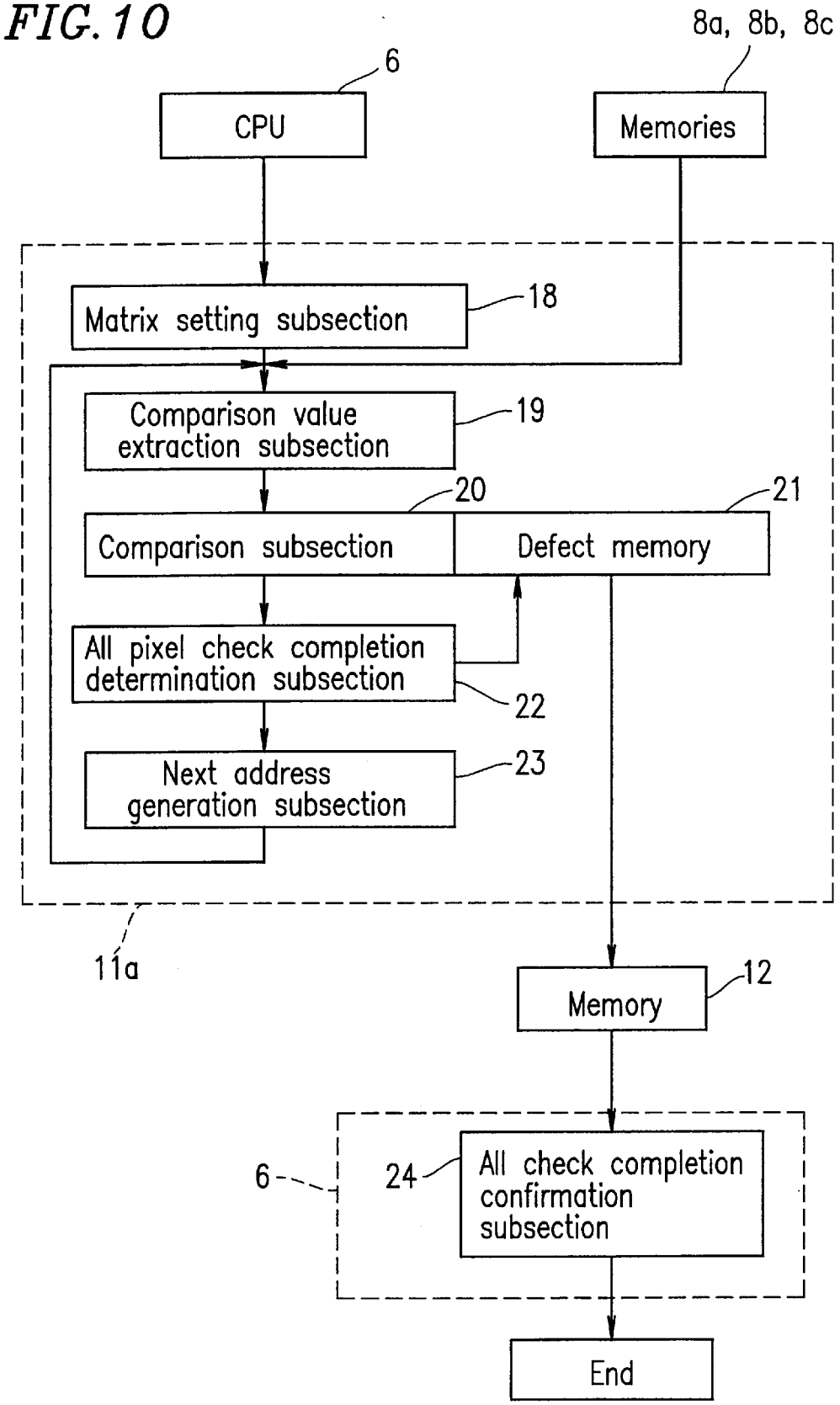
FIG. 10 is a block diagram illustrating the structure of a point defect check section in the image defect detection apparatus according to Example 2 of the present invention.

FIG. 10 is a block diagram illustrating the operation of the point defect check section 11a. The point defect check section 11a includes a matrix setting subsection 18 for setting an inspection reference region and an inspection region, as well as specific comparison positions therein. Specifically, the matrix setting subsection 18 sets the locations, size, and distance between respective matrices or the inspection reference region and the inspection region.

A comparison value extraction subsection 19 extracts a comparison value representing a difference, ratio, etc. between the digital data of a pixel(s) within the inspection reference region (having a matrix size as set by the matrix setting subsection 18) and the digital data of a pixel(s) within the inspection region (having the same matrix size as the inspection reference region as set by the matrix setting subsection 18).

A comparison subsection 20 compares the comparison value which has been extracted by the comparison value extraction subsection 19 against a prescribed threshold value. If any defects are detected based on the comparison performed by the comparison subsection 20, various data concerning the detected defects is stored in a defect memory 21.

The point defect check section 11a further includes an all pixel check completion determination subsection 22 and a next address generation subsection 23. The all pixel check completion determination subsection 22 determines whether or not all of the pixels in the liquid crystal panel 1 have been checked. If the all pixel check completion subsection 22 determines that not all of the pixels in the liquid crystal panel 1 have been checked, the next address generation subsection 23 sets a next address for checking, and the comparison value extraction subsection 19 and the subsequent subsections execute each check item at a different check position as indicated by the next address.

If the all pixel check completion subsection 22 determines that all of the pixels in the liquid crystal panel 1 have been checked, the data stored in the defect memory 21 is output to the memory 12, also shown in FIG. 1. Then, an RGB check completion confirmation subsection 24, which is implemented within the CPU 6, confirms whether or not a check has been completed for all (RGB) color components. If the check has not been completed for all (RGB) color components, then the comparison value extraction subsection 19 performs a check for any color components (R, G, and/or B) that have not yet been checked.

Figure 11:
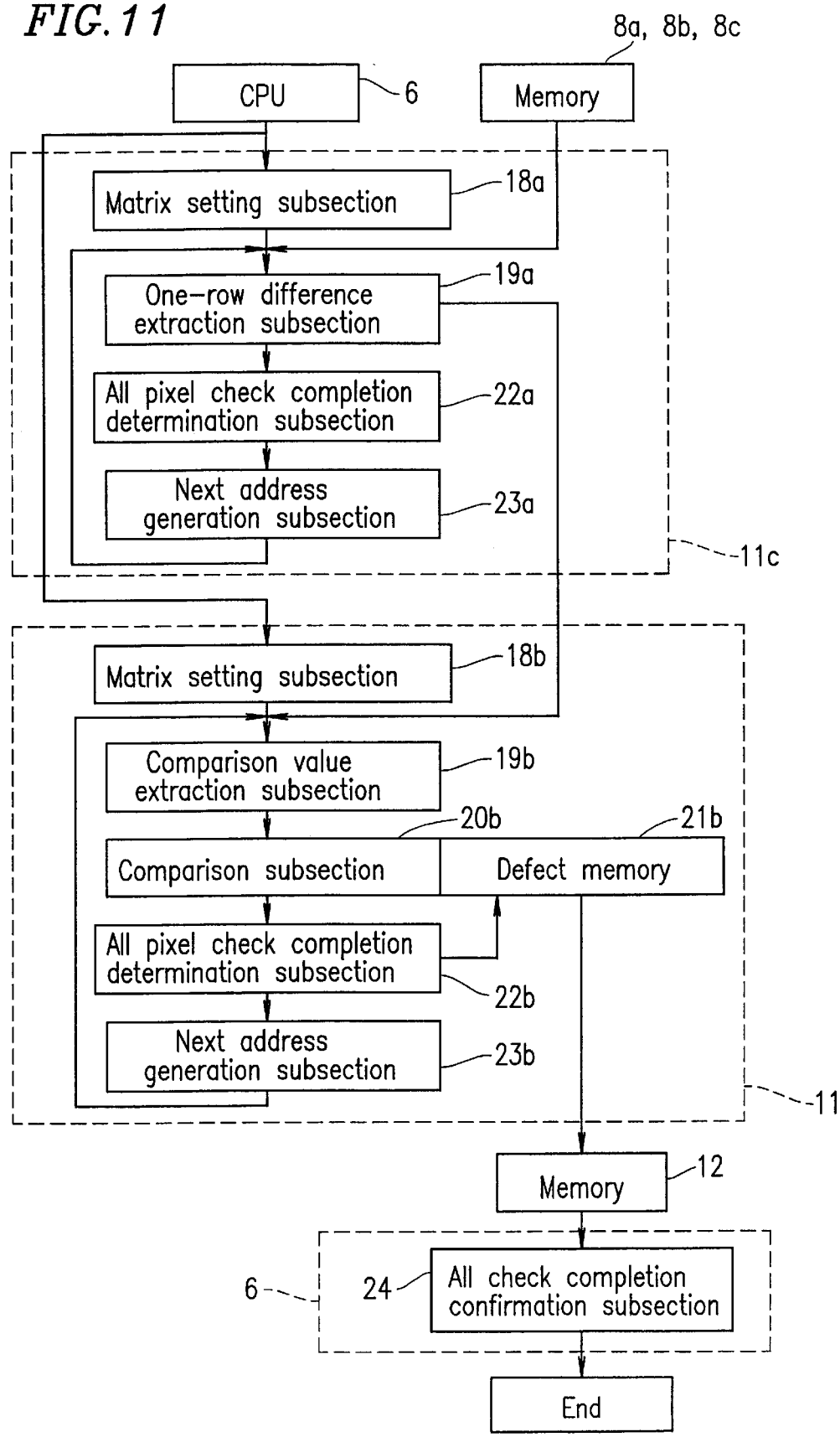
FIG. 11 is a block diagram illustrating the structure of a puddle defect check section in the image defect detection apparatus according to Example 2 of the present invention.

FIG. 11 is a block diagram illustrating the operation of the two puddle defect check sections 11c and 11f, which respectively include matrix setting subsections 18a and 18b having the same function as that of the matrix setting subsection 18 in the point defect check section 11a, described above.

A one-row difference extraction subsection 19a extracts a difference value (hereinafter referred to as a "one-row difference") obtained by comparing the data of the pixels in one row within the matrix defining the inspection reference region 38 (as set by the matrix setting subsection 18a) against the data of the pixels in a corresponding row within the matrix defining the inspection region 39 (as set by the matrix setting subsection 18a).

The one-row difference value extracted by the one-row difference extraction subsection 19a is passed to the second puddle defect check section 11f. A comparison value extraction subsection 19b calculates a sum of n one-row difference values, where n is the number of rows in the matrix size as set by the matrix setting subsection 18b, the calculated sum being used as a comparison value.

A comparison subsection 20b, a defect memory 21b, all pixel check completion determination subsections 22a and 22b, and next address generation subsections 23a and 23b have the same respective functions as those of the comparison subsection 20, the defect memory 21, all pixel check completion determination subsection 22, and next address generation subsections 23, which have been described above with respect to the point defect check section 11a.

Alternatively, a difference value with respect to one column may be calculated by a first processor and a sum of all of the columns in the given matrix size may be calculated by a second processor. Alternatively, the given matrix size (as set by a matrix setting subsection) may be split into a number of submatrices of a desired size, and a difference value with respect to each submatrix may be calculated, and a total of the difference values with respect to all of the submatrices may be calculated to obtain a comparison value. Stain defects and linear defects may also be checked in the same manner as for the puddle defects.

Figure 12:
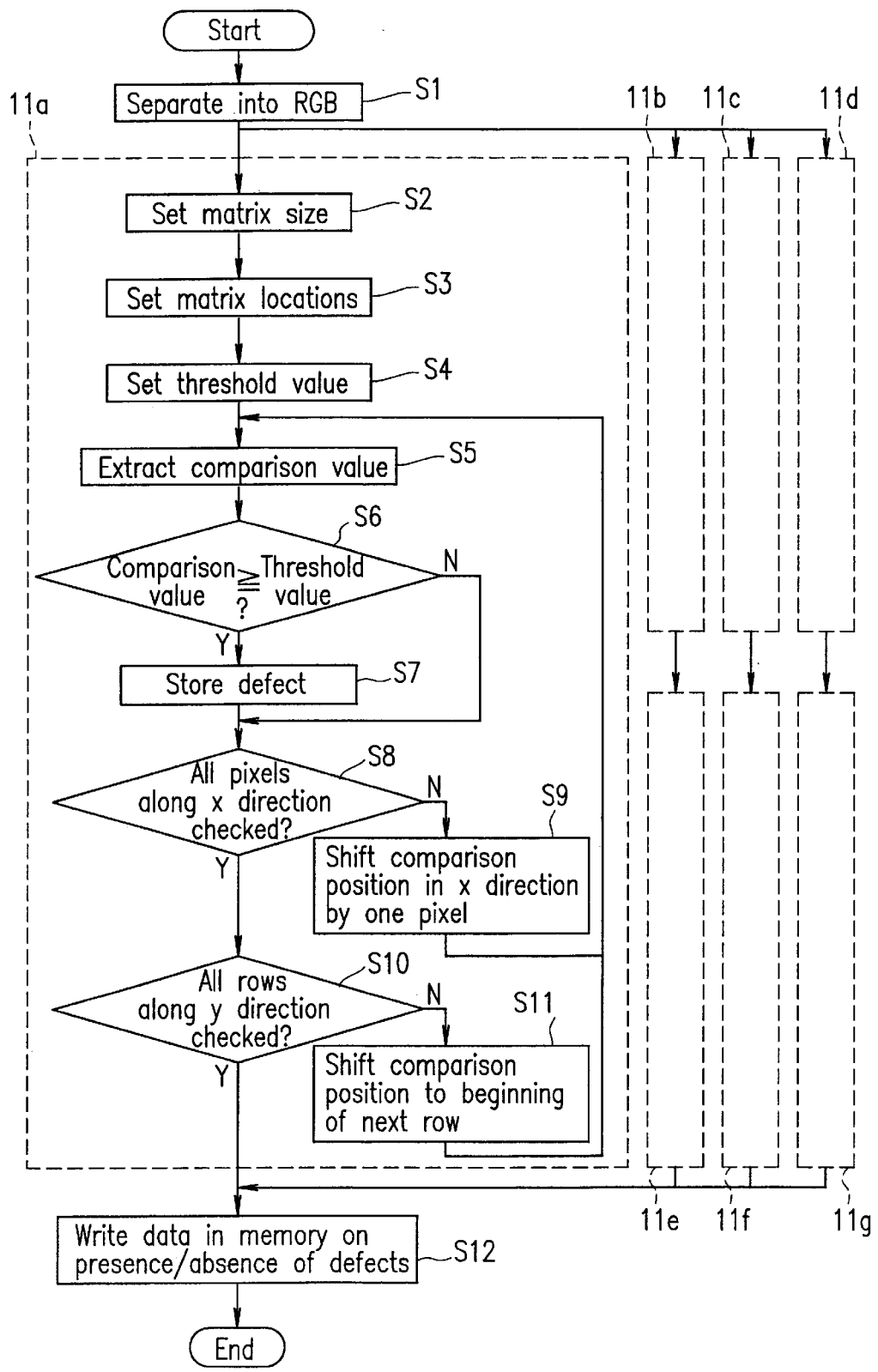
FIG. 12 is a flow chart illustrating an exemplary operation of a point defect check section in the image defect detection apparatus according to Example 2 of the present invention.

FIG. 12 is a flow chart illustrating a defect detection method which is implemented by the image defect detection apparatus according to the present example of the present invention. The detection operation performed by the point defect check section 11a for detecting defects occurring in minute regions, e.g., point defects 14 (FIG. 2) will be described.

First, an image which is taken by the camera 3 and displayed on the display panel 1 is separated by the RGB separation section 7 into the respective color components of RGB (Step S1 in FIG. 12). Next, in order to detect defects occurring in minute regions (e.g., point defects 14), for example, the matrix setting subsection 18 sets the inspection reference region 38 and the inspection region 39 at a relatively small matrix size, e.g., 3 pixels×3 pixels as shown in FIG. 5 (Step S2 in FIG. 12).

It will be appreciated that, as in Example 1, the matrix size/shape of the inspection reference region 38 and the inspection region 39 are not limited to a 3 pixel×3 pixel rectangular region, but may also be a circular or elliptical region. Although a point defect 14 usually appears as a single pixel defect, it may occasionally also affect a number of surrounding pixels, as shown in FIG. 15, due to signal deterioration caused by the A/D conversion or by the passage of signals through wiring. Therefore, in order to detect point defects 14, it is useful to set the inspection reference region 38 and the inspection region 39 at a matrix size which accounts for the effects of such signal deterioration.

Next, as shown in FIG. 5, the inspection region 39 is set on the immediate right-hand side of the inspection reference region 38 (Step S3 in FIG. 12). Usually, in order to detect defects such as point defects 14, it is preferable to set the inspection region 39 and the inspection reference region 38 so as to adjoin each other, in an upper-lower or right-left relationship, so as to minimize the influence of any variation in the digital data of the pixels over the entire display screen. However, the inspection region 39 may be set a few pixels apart from the immediate right-hand side of the inspection reference region 38 in order to take into account the effects of the aforementioned signal deterioration.

Once the locations of the inspection region 39 and the inspection reference region 38 are set, threshold values for determining the presence or absence of defects are set in the comparison subsection 20 (Step S4). One threshold value is set for each of the RGB color components, in accordance with the actual RGB color components of the image presented on the liquid crystal panel 1.

Once the threshold values are set, the comparison value extraction subsection 19 extracts a comparison value (Step S5), which is a difference between a sum of the digital data in all of the pixels within a 3 pixel×3 pixel matrix defining the inspection reference region 38 as set in Steps S2 and S3 and a sum of the digital data in all of the pixels within a 3 pixel×3 pixel matrix defining the inspection region 39 as set in Steps S2 and S3.

The comparison value which has thus been extracted is compared against the threshold value which has been set in Step S4 (Step S6), whereby the presence or absence of defects in the displayed image on the liquid crystal panel 1 is determined.

The matrix sizes and various data values for the defect detection processes are set in the subsections 18 to 23 shown in FIG. 10. For example, assume that the digital data of one pixel consists of 8 bits from 0 to 255, and that an ideal digital data value in any image taken by the camera 3 is supposed to be 128. If the sum of the digital data in all of the pixels in the inspection reference region 38 of the matrix size shown in FIG. 5 is 1100 and the sum of the digital data in all of the pixels in the inspection region 39 is 1150, then the comparison value is calculated to be 50 (=1150−1100) through the comparison extraction in Step S5 (FIG. 12). Assuming that a threshold value of 40 has been set in Step S4, the comparison in Step S6 indicates that 50 (comparison value) ≧40 (threshold value). Therefore, it is determined that a defect is present at this particular comparison position. Conversely, with a threshold value of 60, for example, no defect would be determined at this particular comparison position.

If a defect is determined, the information concerning the location and the like of the defect is stored in the defect memory 21 (Step S7).

When the check for a predetermined comparison position is completed, it is determined whether or not all of the pixels in a given row (extending along the x direction) have been checked (Step S8). If it is determined that not all of the pixels in that row have been checked, the comparison position is shifted by one pixel along the x direction (i.e., toward the right in this example) (Step S9) and a similar check is performed for the new comparison position. If it is determined that all of the pixels in the row have been checked, then it is determined whether or not all of the rows along the y direction within the inspection region 39 and the inspection reference region 38 have been checked (Step S10). If it is determined that not all of the rows along the y direction within the inspection region 39 and the inspection reference region 38 have been checked, then the comparison position is shifted to the beginning of a next row, and a similar check is performed for the new comparison position (Step S11).

Although the above-illustrated digital data comparison is based on a comparison between a threshold value and a comparison value which is a difference between the sums of the digital data in all of the pixels within the inspection region 39 and the inspection reference region 38, the comparison value may alternatively be a difference between mean values or change ratios of the digital data in all of the pixels within the inspection region 39 and the inspection reference region 38.

Although the inspection region 39 and the inspection reference region 38 are illustrated as being of the same size, they may be of different sizes in the case where a comparison is made on the basis of mean values. It would be more effective to perform a comparison based on the data in a number of pixels, rather than based on a single pixel, because a point defect, although being a defect contained in a single pixel by definition, is often accompanied by some degradation associated with the A/D conversion performed by an A/D converter, signal deterioration on various wiring, etc., and may hence result in defects of a number of pixels clustered around one particular pixel, as shown in FIG. 15.

Although the comparison is made along the horizontal or x direction in the above example, the detection accuracy may be further increased by also performing a comparison along the vertical or y direction.

In the above-illustrated example, where the inspection region 39 is designated on the right side of the inspection reference region 38 along the x direction, the comparison position is shifted by every one pixel toward the right along the x direction, and after the checks for all of the pixels in a given row have been completed, the checks are continued at the beginning of a subsequent row (i.e., one row down along the y direction). Alternatively, in embodiments of the present invention where the inspection region 39 is designated on the left side of the inspection reference region 38, the comparison position will be shifted by every one pixel toward the left along the x direction. Alternatively, in embodiments where the inspection region 39 is designated below the inspection reference region 38, the comparison position will be shifted down by every one pixel along the y direction.

Thus, the entire image is checked for point defects 14 with respect to each of the RGB color components. Concurrently, the stain defect detection sections 11b and 11e perform detection of stain defects;

the puddle defect detection sections 11c and 11f perform detection of puddle defects 17; and the linear defect detection sections 11d and 11g perform detection of linear defects 16. The entire image defect detection process will end upon completion of all of the check items.

In order to detect stain defects 15, as in Example 1, the matrix size of the inspection reference region 38 and the inspection region 39 is set to a size which is larger than that employed for detecting point defects 14, and a stain defect 15 is determined if the comparison value is equal to or greater than the predetermined threshold value. If the matrix size is so large that the processing is too time-consuming, a number of processors may be used as illustrated in FIG. 9.

Figure 13:
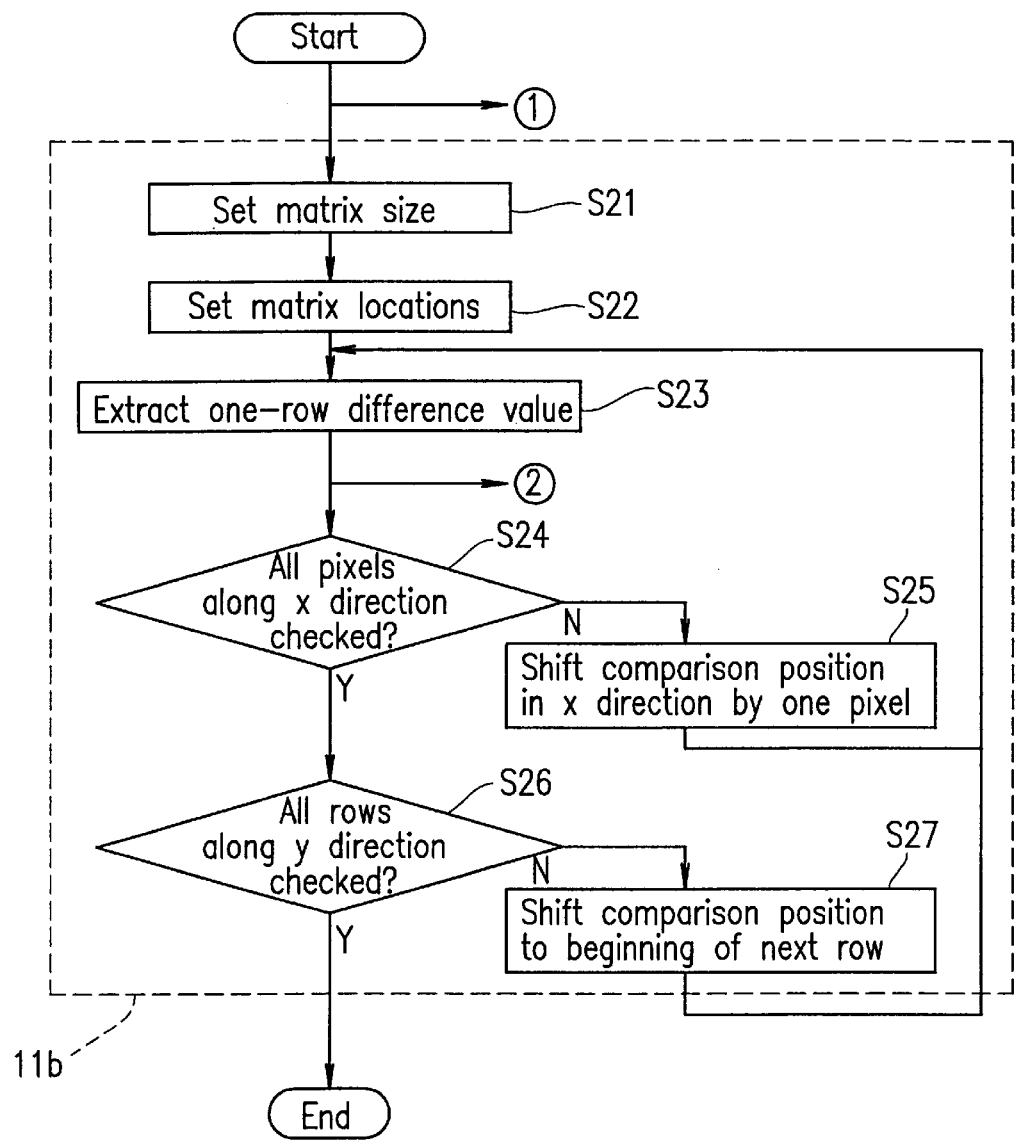
FIG. 13 is a flow chart illustrating an exemplary operation of a first stain defect check section in the image defect detection apparatus according to Example 2 of the present invention.
Figure 14:
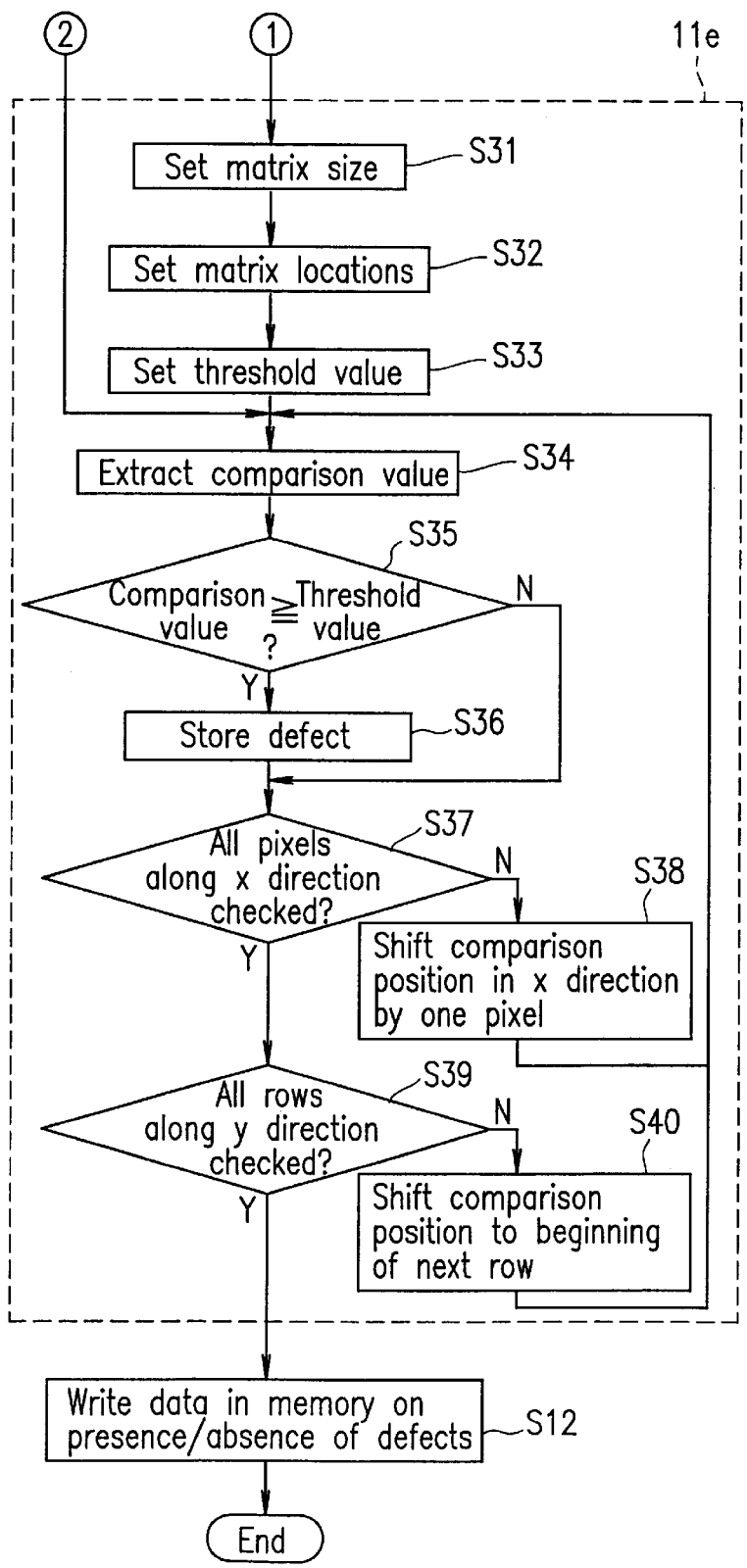
FIG. 14 is a flow chart illustrating an exemplary operation of a second stain defect check section in the image defect detection apparatus according to Example 2 of the present invention.

FIGS. 13 and 14 are flow charts illustrating a defect detection operation in the case of employing a plurality of processors. The detection operation performed by the stain defect check sections 11b and 11e for detecting stain defects 15 (FIG. 2) will be described.

First, image data which has been separated into the respective color components of RGB is received by the first and second stain defect check sections 11b and 11e the (①) in FIGS. 13 and 14). Firstly, in the first stain defect check section 11b, the matrix setting subsection 18a sets, e.g., a 6 pixel×4 pixel matrix size (Step S21 in FIG. 13) and the locations (Step S22 in FIG. 13) of the inspection reference region 38 and the inspection region 39. Concurrently, in the second stain defect check section 11e, the matrix setting subsection 18b sets, e.g., a 6 pixel×4 pixel matrix size (Step S31 in FIG. 14) and the locations (Step S32 in FIG. 14) of the inspection reference region 38 and the inspection region 39. Furthermore, in the second stain defect check section 11e, threshold values for determining the presence or absence of defects are set in the comparison subsection 20b (Step S34 in FIG. 14).

Then, in the first stain defect check section 11b, the one-row difference extraction subsection 19a extracts a one-row difference value between the inspection region 39 and the inspection reference region 38 with respect to one row. For example, in the case of a 6 pixel×4 pixel matrix, a one-row difference value with respect to 6 pixels is extracted (Step S23 in FIG. 13). The difference value is passed to the second stain defect check section 11e (② in FIGS. 13 and 14).

When the check for a predetermined comparison position is completed, it is determined whether or not all of the pixels in a given row (extending along the x direction) have been checked (Step S24 in FIG. 13). If it is determined that not all of the pixels in that row have been checked, the comparison position is shifted by one pixel along the x direction (i.e., toward the right in this example) (Step S25 in FIG. 13) and a similar check is performed for the new comparison position. If it is determined that all of the pixels in the row have been checked, then it is determined whether or not all of the rows along the y direction within the inspection region 39 and the inspection reference region 38 have been checked (Step S26 in FIG. 13). If it is determined that not all of the rows along the y direction within the inspection region 39 and the inspection reference region 38 have been checked, then the comparison position is shifted to the beginning of a next row (Step S27 in FIG. 13), and a similar check is performed for the new comparison position. Such extraction of one-row difference values is performed for all pixels.

Based on the difference value data received from the first stain defect check section 11b (② in FIG. 14), the second stain defect check section 11e, the comparison subsection 19d calculates a sum of n one-row difference values, where n is the number of rows in the matrix size as set by the matrix setting subsection 18b, the calculated sum being used as a comparison value (Step S34). For example, in the case of a 6 pixel×4 pixel matrix, a sum of one-row difference values over 4 rows is calculated to give a comparison value.

The extracted comparison value is compared against the threshold value set in Step S33 by the comparison subsection 20 (Step S35), thereby determining the presence or absence of a defect in the display screen of the liquid crystal display panel 1. If a defect is determined, the information concerning the location and the like of the defect is stored in the defect memory 21 (Step S36).

When the check for a predetermined comparison position is completed, it is determined whether or not all of the pixels in a given row (extending along the x direction) have been checked (Step S37). If it is determined that not all of the pixels in that row have been checked, the comparison position is shifted by one pixel along the x direction (i.e., toward the right in this example) (Step S38) and a similar check is performed for the new comparison position. If it is determined that all of the pixels in the row have been checked, then it is determined whether or not all of the rows along the y direction within the inspection region 39 and the inspection reference region 38 have been checked (Step S39). If it is determined that not all of the rows along the y direction within the inspection region 39 and the inspection reference region 38 have been checked, then the comparison position is shifted to the beginning of a next row, and a similar check is performed for the new comparison position (Step S40).

Although the above example illustrates a case where the first stain defect check section 11b calculates a one-row difference value and second stain defect check section 11e calculates a sum of n one-row difference values, where n is the number of rows in the matrix size as set by the matrix setting subsection 18b, the calculated sum being used as a comparison value, it should be pointed out that, for a higher efficiency, the burden for each processor is preferably evened out so that they process similar amounts of data with similar processing times. Although the use of first and second processing sections are illustrated in the above example, three or more processing sections may be used.

In order to detect puddle defects 17, the matrix size of the inspection reference region 38 and the inspection region 39 is set to a relatively large size (e.g., 30 pixels×30 pixels) which is larger than that employed for detecting point defects 14, as shown in FIG. 6. Since a puddle defect 17 contains digital data which gradually varies over a number of pixels therein, the inspection region 39 is preferably set to an appropriate distance from the inspection reference region 38 as shown in FIG. 6.

In an image which is taken by the camera 3, the digital data output from pixels present in the central portion of the display is likely to be boosted by the lens 2. Therefore, in the case where the inspection reference region 38 and the inspection region 39 are set side by side along the x direction (horizontal direction), it would be effective to ensure that the inspection reference region 38 and the inspection region 39 are set apart by about half of the horizontal dimension of the displayed image.

The difference between the digital data in the pixels within the inspection region 39 and the digital data in the pixels within the inspection reference region 38 is used as a comparison value, based on which puddle defects 17 can be detected. A relatively small comparison value qualifies for determining puddle defects 17.

In order to detect line defects 16 which extend along the vertical direction (y direction), the inspection reference region 38 and the inspection region 39 are prescribed with an elongated matrix size along the y direction (e.g., 2 pixels (x direction)×50 pixels (y direction)) which is larger than that employed for detecting point defects 14, as shown in FIG. 7. It is preferable to set the inspection region 39 and the inspection reference region 38 so as to adjoin each other in order to minimize the influence of any variation in the digital data of the pixels over the entire display screen. Line defects 16 extending along the vertical direction (y direction) may be sufficiently detected by simply comparing the digital data in each pixel in the horizontally adjoined inspection region 39 and inspection reference region 38.

In order to detect line defects 16 which extend along the horizontal direction (x direction), the inspection reference region 38 and the inspection region 39 are prescribed with an elongated matrix size along the x direction (e.g., 50 pixels (x direction)×2 pixels (y direction)) which is larger than that employed for detecting point defects 14. Line defects 16 extending along the horizontal direction (x direction) may be sufficiently detected by setting the inspection region 39 and inspection reference region 38 so as to vertically adjoin each other, and simply comparing the digital data in each pixel therein.

According to Example 2, the detection processes of point defects, stain defects, puddle defects, and linear defects are performed by a plurality of processors in parallel so that a faster operation is obtained. An even faster operation can be obtained by performing detection processes of stain defects, puddle defects, and linear defects by using two or more processors.

Thus, by changing the matrix size and relative locations of the inspection region 39 and the inspection reference region 38 and employing different threshold values for detecting different types of defects, it is possible to detect various types of defects with a high accuracy. Thus, the quality of satisfactory final products can be further improved.

Usually, the preferable threshold value per pixel (threshold value/matrix) is largest for the detection of point defects 14, followed by stain defects 15 and line defects 16, and smallest for the detection of puddle defects 17. Similarly, the preferable matrix size of the inspection region 39 and the inspection reference region 38 is smallest for the detection of point defects 14, followed by stain defects 15 and line defects 16, and largest for the detection of puddle defects 17.

Although the above example illustrates a case where one threshold value is employed for distinguishing satisfactory products from defective products, it is applicable to employ two or more threshold values for classifying inspected products into a number of quality ranks.

According to Example 2, such checks can be performed in parallel with respect to each color component and/or each check item, whereby a fast defect detection is obtained.

Although an image is separated into RGB color components according to Examples 1 and 2, any other XYZ color system, or a L*a*b* color system may alternatively be used.

Although Examples 1 and 2 are directed to the detection of defects in an image displayed on a liquid display panel (denoted as 1 in FIG. 1), any device that requires a level of uniformity, e.g., a layer of coating or paint on a given surface, a cathode ray tube, an imaging device itself (e.g., where the camera portion is used as an imaging device, etc.) can also be checked by the detection method according to the present invention.

The detection method according to the present invention may find further utility in the form of a procedure stored in an appropriate storage medium.

Thus, according to the present invention, it is possible to accurately detect various defects, e.g., point defects, stain defects, puddle defects, or linear defects, without imposing any requirements on the proficiency or physical condition of a human inspector. As a result, unsatisfactory products can be highly accurately distinguished from among inspected products, thereby improving the quality of satisfactory final products. In embodiments where image defect detection is performed via the use of an A/D converter, it is possible to perform a defect detection in accordance with the characteristics of the particular A/D converter used.

In one embodiment of the present invention, various check items can be executed in parallel, thereby making for a fast defect detection.

In another embodiment of the present invention, it is possible to check for a large number of defect types without substantially increasing the processing time.

In still another embodiment of the present invention, the burden for each processor constituting a defect check section is evened out for a faster processing.

In still another embodiment of the present invention, it is possible to minimize the influence of any variation in the digital data of the pixels over the entire display screen, thereby enabling reliable detection of point defects, stain defects, and linear defects. It is also possible to detect those defects (e.g., puddle defects) which hardly show any microscopic changes in adjacent areas but do exhibit a substantial variation over a relatively large area. Moreover, it is possible to perform a defect detection while taking into consideration the degradation associated with the A/D conversion performed by an A/D converter or the like.

In still another embodiment of the present invention, it is possible to detect those defects (e.g., puddle defects) which hardly show any microscopic changes in adjacent areas but do exhibit a substantial variation over a relatively large area. The detection of such macroscopic defects may be effectively achieved by prescribing a distance between an inspection region and an inspection reference region, without substantially increasing their size, or the processing time (which is a function of the size of the inspection region and the inspection reference region). As a result, a fast defect detection can be achieved.

In still another embodiment of the present invention, those defects which hardly show any microscopic changes on a pixel to pixel basis but do exhibit a substantial variation in aggregation (e.g., stain defects, puddle defects, or linear defects) can be detected, irrespective of their sizes or shapes, while taking into consideration the degradation associated with the A/D conversion performed by an A/D converter or the like.

In still another embodiment of the present invention, it is possible to minimize the influence of degradation associated with the A/D conversion performed by an A/D converter or the like by setting a matrix size in accordance with output characteristics of the A/D converter.

In still another embodiment of the present invention, it is possible to ensure that any degradation associated with the A/D conversion performed by an A/D converter or the like occurs in a uniform manner in up/down/right/left directions, thereby making it possible to detect point defects having a relatively small level difference as compared to their surrounding pixels.

In still another embodiment of the present invention, it is possible to detect defects which have elongated shapes extending in one direction.

In still another embodiment of the present invention, defects in a single color component, or defects having similar level alterations occurring in all colors, which would otherwise be difficult to detect without color separation, can be detected.

In still another embodiment of the present invention, defect checks for respective color components, even though performed separately, can be processed in parallel or concurrently, thereby providing a fast defect detection.

In still another embodiment of the present invention, it is possible to properly distinguish satisfactory products from unsatisfactory products by taking into consideration the effects exerted by respective colors on the human vision and ensuring that virtually any defect that will appear as defective to the human vision would be determined as defective.

In still another embodiment of the present invention, it is possible to perform a check for the entire display screen.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image defect detection apparatus comprising:
    an image acquisition section for acquiring an image as image data;
    a check section for checking for the presence or absence of a defect in the image, the defect being of one of a plurality of different types;
    wherein the check section comprises:
        a matrix setting subsection for setting, within the acquired image, an inspection reference region and an inspection region in accordance with each type of defect;
        a comparison value extraction subsection for extracting a comparison value based on image data in the inspection reference region and image data in the inspection region as set by the matrix setting subsection; and
        a comparison subsection for determining the presence or absence of the defect based on a comparison between the comparison value extracted by the comparison value extraction subsection and a predetermined threshold value.

2. An image defect detection apparatus according to claim 1, wherein the image data acquired by the image acquisition section is image analog data, and the image defect detection apparatus further comprises an A/D converter for converting the image analog data into image digital data.

3. An image defect detection apparatus according to claim 2, further comprising a color separation section for separating the image data into respective color components of a color system.

4. An image defect detection apparatus according to claim 3, wherein the image data is image digital data.

5. An image defect detection apparatus according to claim 3, wherein the image data is image analog data.

6. An image defect detection apparatus according to claim 3, wherein the color separation section performs a check with respect to each separated color component concurrently.

7. An image defect detection apparatus according to claim 3, wherein the predetermined threshold value is adjusted according to the respective color components of the color system.

8. An image defect detection apparatus according to claim 1, wherein the matrix setting subsection sets a location and a size for each of the inspection reference region and the inspection region, and a distance therebetween.

9. An image defect detection apparatus according to claim 8, wherein the matrix setting subsection sets the locations of the inspection reference region and the inspection region so as to adjoin each other in a case where the defect being checked for is a point defect, a stain defect, or a linear defect.

10. An image defect detection apparatus according to claim 9, wherein the matrix setting subsection sets the inspection reference region and the inspection region so as to be at a distance from each other in a case where the defect being checked for is a puddle defect, the distance comprising at least one pixel.

11. An image defect detection apparatus according to claim 8, wherein the matrix setting subsection sets the size of the inspection reference region and the inspection region at a first value in a case where the defect being checked for is a stain defect, a puddle defect, or a linear defect, and at a second value in a case where the defect being checked for is a point defect, the first value being greater than the second value.

12. An image defect detection apparatus according to claim 1, wherein the inspection reference region and the inspection region are each defined as a block consisting of M pixels along a horizontal direction and N pixels along a vertical direction, and wherein M and N are natural numbers such that the relationship M=N=1 does not hold.

13. An image defect detection apparatus according to claim 12, wherein the image data acquired by the image acquisition section is image analog data, and the image defect detection apparatus further comprises an A/D converter for converting the image analog data into image digital data, and
    wherein at least one of M and N is set to a value in accordance with output characteristics of the A/D converter.

14. An image defect detection apparatus according to claim 12, wherein M=N in a case where the defect being checked for is a point defect.

15. An image defect detection apparatus according to claim 12, wherein M<N in a case where the defect being checked for is a linear defect extending along a vertical direction.

16. An image defect detection apparatus according to claim 12, wherein M>N in a case where the defect being checked for is a linear defect extending along a horizontal direction.

17. An image defect detection apparatus according to claim 1, wherein a comparison position is shifted pixel by pixel within the inspection reference region and the inspection region, the comparison position being sequentially checked for the presence or absence of a defect in the image acquired by the image acquisition section.

18. An image defect detection apparatus comprising:
    an image acquisition section for acquiring an image as image data;
    a plurality of check sections each for checking for the presence or absence of a defect in the image in parallel, the defects being of different types;
    wherein each check section comprises:
        a matrix setting subsection for setting, within the acquired image, an inspection reference region and an inspection region in accordance with each type of defect;
        a comparison value extraction subsection for extracting a comparison value based on image data in the inspection reference region and image data in the inspection region as set by the matrix setting subsection; and a comparison subsection for determining the presence or absence of the defect based on a comparison between the comparison value extracted by the comparison value extraction subsection and a predetermined threshold value.

19. An image defect detection apparatus according to claim 18, wherein the image data acquired by the image acquisition section is image analog data, and the image defect detection apparatus further comprises an A/D converter for converting the image analog data into image digital data.

20. An image defect detection apparatus according to claim 19, further comprising a color separation section for separating the image data into respective color components of a color system.

21. An image defect detection apparatus according to claim 20, wherein the image data is image digital data.

22. An image defect detection apparatus according to claim 20, wherein the image data is image analog data.

23. An image defect detection apparatus according to claim 20, wherein the color separation section performs a check with respect to each separated color component concurrently.

24. An image defect detection apparatus according to claim 20, wherein the predetermined threshold value is adjusted according to the respective color components of the color system.

25. An image defect detection apparatus according to claim 18, wherein each check section comprises at least one processor for performing the checking.

26. An image defect detection apparatus according to claim 18, wherein one or more of the plurality of check sections is dedicated to checking for the presence or absence of a stain defect, a puddle defect, or a linear defect, and the one or more check sections each comprises at least two processors for performing the checking.

27. An image defect detection apparatus according to claim 18, wherein the matrix setting subsection sets a location and a size for each of the inspection reference region and the inspection region, and a distance therebetween.

28. An image defect detection apparatus according to claim 27, wherein the matrix setting subsection sets the locations of the inspection reference region and the inspection region so as to adjoin each other in a case where the defect being checked for is a point defect, a stain defect, or a linear defect.

29. An image defect detection apparatus according to claim 28, wherein the matrix setting subsection sets the inspection reference region and the inspection region so as to be at a distance from each other in a case where the defect being checked for is a puddle defect, the distance comprising at least one pixel.

30. An image defect detection apparatus according to claim 27, wherein the matrix setting subsection sets the size of the inspection reference region and the inspection region at a first value in a case where the defect being checked for is a stain defect, a puddle defect, or a linear defect, and at a second value in a case where the defect being checked for is a point defect, the first value being greater than the second value.

31. An image defect detection apparatus according to claim 18, wherein the inspection reference region and the inspection region are each defined as a block consisting of M pixels along a horizontal direction and N pixels along a vertical direction, and wherein M and N are natural numbers such that the relationship M=N=1 does not hold.

32. An image defect detection apparatus according to claim 31, wherein the image data acquired by the image acquisition section is image analog data, and the image defect detection apparatus further comprises an A/D converter for converting the image analog data into image digital data, and
wherein at least one of M and N is set to a value in accordance with output characteristics of the A/D converter.

33. An image defect detection apparatus according to claim 31, wherein M=N in a case where the defect being checked for is a point defect.

34. An image defect detection apparatus according to claim 31, wherein M<N in a case where the defect being checked f or is a linear defect extending along a vertical direction.

35. An image defect detection apparatus according to claim 31, wherein M>N in a case where the defect being checked for is a linear defect extending along a horizontal direction.

36. An image defect detection apparatus according to claim 18, wherein a comparison position is shifted pixel by pixel within the inspection reference region and the inspection region, the comparison position being sequentially checked for the presence or absence of a defect in the image acquired by the image acquisition section.

37. An image defect detection method comprising:
an image acquisition step of acquiring an image as image data;
a checking step of checking for the presence or absence of a defect in the image, the defect being of one of a plurality of different types;
wherein the checking step comprises:
a matrix setting substep of setting, within the acquired image, an inspection reference region and an inspection region in accordance with each type of defect;
a comparison value extraction substep of extracting a comparison value based on image data in the inspection reference region and image data in the inspection region as set by the matrix setting substep; and
a comparison substep of determining the presence or absence of the defect based on a comparison between the comparison value extracted by the comparison value extraction substep and a predetermined threshold value.

38. An image defect detection method according to claim 37, wherein the image data acquired by the image acquisition step is image analog data, and the image defect detection method further comprises an A/D conversion step for converting the image analog data into image digital data.

39. An image defect detection method according to claim 38, further comprising a color separation step of separating the image data into respective color components of a color system.

40. An image defect detection method according to claim 39, wherein the image data is image digital data.

41. An image defect detection method according to claim 39, wherein the image data is image analog data.

42. An image defect detection method according to claim 39, wherein the color separation step performs a check with respect to each separated color component concurrently.

43. An image defect detection method according to claim 39, wherein the predetermined threshold value is adjusted according to the respective color components of the color system.

44. An image defect detection method according to claim 37, wherein the matrix setting substep sets a location and a size for each of the inspection reference region and the inspection region, and a distance therebetween.

45. An image defect detection method according to claim 37, wherein a comparison position is shifted pixel by pixel within the inspection reference region and the inspection region, the comparison position being sequentially checked for the presence or absence of a defect in the image acquired by the image acquisition step.

46. An image defect detection method comprising:
   an image acquisition step of acquiring an image as image data;
   a plurality of checking steps of checking for the presence or absence of a defect in the image in parallel, the defects being of different types;
   wherein each checking step comprises:
      a matrix setting substep of setting, within the acquired image, an inspection reference region and an inspection region in accordance with each type of defect;
      a comparison value extraction substep of extracting a comparison value based on image data in the inspection reference region and image data in the inspection region as set by the matrix setting substep; and
      a comparison substep of determining the presence or absence of the defect based on a comparison between the comparison value extracted by the comparison value extraction substep and a predetermined threshold value.

47. An image defect detection method according to claim 46, wherein the image data acquired by the image acquisition step is image analog data, and the image defect detection method further comprises an A/D conversion step for converting the image analog data into image digital data.

48. An image defect detection method according to claim 47, further comprising a color separation step of separating the image data into respective color components of a color system.

49. An image defect detection method according to claim 48, wherein the image data is image digital data.

50. An image defect detection method according to claim 48, wherein the image data is image analog data.

51. An image defect detection method according to claim 48, wherein the color separation step performs a check with respect to each separated color component concurrently.

52. An image defect detection method according to claim 48, wherein the predetermined threshold value is adjusted according to the respective color components of the color system.

53. An image defect detection method according to claim 46, wherein one or more of the plurality of checking steps is dedicated to checking for the presence or absence of a stain defect, a puddle defect, or a linear defect, and the one or more checking steps each comprises at least two discrete substeps.

54. An image defect detection method according to claim 46, wherein the matrix setting substep sets a location and a size for each of the inspection reference region and the inspection region, and a distance therebetween.

55. An image defect detection method according to claim 46, wherein a comparison position is shifted pixel by pixel within the inspection reference region and the inspection region, the comparison position being sequentially checked for the presence or absence of a defect in the image acquired by the image acquisition step.

56. A storage medium in which a procedure of an image defect detection method is stored, the image defect detection method comprising:
   an image acquisition step of acquiring an image as image data;
   a checking step of checking for the presence or absence of a defect in the image, the defect being of one of a plurality of different types;
   wherein the checking step comprises:
      a matrix setting substep of setting, within the acquired image, an inspection reference region and an inspection region in accordance with each type of defect;
      a comparison value extraction substep of extracting a comparison value based on image data in the inspection reference region and image data in the inspection region as set by the matrix setting substep; and
      a comparison substep of determining the presence or absence of the defect based on a comparison between the comparison value extracted by the comparison value extraction substep and a predetermined threshold value.

57. A storage medium in which a procedure of an image defect detection method is stored, the image defect detection method comprising:
   an image acquisition step of acquiring an image as image data;
   a plurality of checking steps of checking for the presence or absence of a defect in the image in parallel, the defects being of different types;
   wherein each checking step comprises:
      a matrix setting substep of setting, within the acquired image, an inspection reference region and an inspection region in accordance with each type of defect;
      a comparison value extraction substep of extracting a comparison value based on image data in the inspection reference region and image data in the inspection region as set by the matrix setting substep; and
      a comparison substep of determining the presence or absence of the defect based on a comparison between the comparison value extracted by the comparison value extraction substep and a predetermined threshold value.

* * * * *